United States Patent
Hamada et al.

(10) Patent No.: US 8,557,429 B2
(45) Date of Patent: Oct. 15, 2013

(54) BATTERY PACK HAVING BATTERY MODULES HELD BY HOLDING SPACERS

(75) Inventors: Shinji Hamada, Toyohashi (JP); Yoshitaka Sugimoto, Toyohashi (JP); Toyohiko Eto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1094 days.

(21) Appl. No.: 11/884,616

(22) PCT Filed: Feb. 2, 2006

(86) PCT No.: PCT/JP2006/302220
§ 371 (c)(1), (2), (4) Date: Aug. 17, 2007

(87) PCT Pub. No.: WO2006/087962
PCT Pub. Date: Aug. 24, 2006

(65) Prior Publication Data
US 2008/0124622 A1 May 29, 2008

(30) Foreign Application Priority Data
Feb. 18, 2005 (JP) ................................. 2005-042742

(51) Int. Cl.
*H01M 2/02* (2006.01)

(52) U.S. Cl.
USPC ........... 429/153; 429/152; 429/159; 429/162; 429/163

(58) Field of Classification Search
None
See application file for complete search history.

(56) References Cited

U.S. PATENT DOCUMENTS

| | | | | |
|---|---|---|---|---|
| 5,378,555 A | * | 1/1995 | Waters et al. | 429/97 |
| 5,639,571 A | * | 6/1997 | Waters et al. | 429/71 |
| 2003/0027044 A1 | * | 2/2003 | Asahina et al. | 429/179 |
| 2004/0131932 A1 | * | 7/2004 | Hamada et al. | 429/175 |
| 2005/0058890 A1 | * | 3/2005 | Brazell et al. | 429/99 |
| 2006/0115719 A1 | * | 6/2006 | Jeon et al. | 429/156 |

FOREIGN PATENT DOCUMENTS

| | | | |
|---|---|---|---|
| JP | 9-199093 | | 7/1997 |
| JP | 09-199093 | * | 7/1997 |
| JP | 11-126585 | | 5/1999 |
| JP | 2000-048867 | | 2/2000 |
| JP | 2001-236937 | | 8/2001 |
| JP | 2001-268717 | | 9/2001 |
| JP | 2003-036830 | | 2/2003 |
| JP | 2005-005167 | * | 1/2005 |
| JP | 2005-5167 | | 1/2005 |
| WO | WO 98/31059 | | 7/1998 |

* cited by examiner

OTHER PUBLICATIONS

International Search Report.

*Primary Examiner* — Ula C Ruddock
*Assistant Examiner* — Tony Chuo
(74) *Attorney, Agent, or Firm* — Finnegan, Henderson, Farabow, Garrett & Dunner, LLP

(57) ABSTRACT

An object is to provide a battery pack which can restrict movements of battery a module and a spacer even after use for a long period. A battery pack 100 comprises a plurality of battery modules 110, a plurality of holding spacers 130 each being placed in a space between the battery modules, and a first and second spacer support members 160, 170 which hold the holding spacers 130 in a vertical direction Z. Each holding spacer 130 includes a plurality of first elastic members 143 and a plurality of second elastic members 145 which protrude in the vertical direction Z. The holding spacer 130 is elastically held between the first and second spacer support members 160, 170 while the first and second elastic members 143, 145 are elastically deformed into elastic pressure contact with the first and second spacer support members 160, 170.

8 Claims, 14 Drawing Sheets

BATTERY PACK HAVING BATTERY MODULES HELD BY HOLDING SPACERS

TECHNICAL FIELD

The invention relates to a battery pack constructed of a plurality of battery modules arranged with a space therebetween, each battery module including a plurality of cells arranged in line. More particularly, the invention relates to a battery pack including a holding spacer placed in a space between adjacent battery modules for holding the battery modules.

BACKGROUND ART

Heretofore, a battery pack has been known which has a plurality of battery modules arranged with a spacer placed between the adjacent modules, each battery module including a plurality of cells. Such a battery pack has the battery modules and the spacers held in some way. For example, in each battery pack as disclosed in Patent Document 1 and Patent Document 2, end plates are placed to clasp battery modules and spacers by means of retaining rods and retaining bands, thereby holding the battery modules and the spacers. In a battery pack as disclosed in Patent Document 3, a battery pack case is used to hold the battery modules and the spacers.

Patent Document 1: Jpn. unexamined patent publication No. 11-126585

Patent Document 2: National publication of Translated Version No. 2001-507856

Patent Document 3: Jpn. unexamined patent publication No. 2005-5167

DISCLOSURE OF INVENTION

Problems to be Solved by the Invention

After the above conventional battery packs are used to be mounted on, for example, a hybrid electric vehicle or an electric vehicle, for a long period under a severe condition, a spacer may be deformed to cause a space between a battery module and the spacer. This may cause the battery module and the spacer to freely move inside the battery pack.

The invention has been accomplished in view of the above-mentioned problems, and it is an object of the invention to provide a battery pack which can restrict movements of battery a module and a holding spacer even after use for a long period.

Means for Solving the Problems

A means for solving is a battery pack comprising: a plurality of battery modules each including a plurality of cells arranged in line, the battery modules being arranged with a space therebetween in a direction perpendicular to a cell arrangement direction in which the cells are arranged; one or more holding spacers which are placed in the space between the battery modules and hold the battery modules; and a first spacer support member and a second spacer support member which hold the holding spacer therebetween in a vertical direction perpendicular to both the cell arrangement direction and a module arrangement direction in which the battery modules are arranged, wherein the holding spacer includes one or more first elastic portions arranged to face the first spacer support member and to be elastically deformed in the vertical direction, and the holding spacer is elastically held between the first and second spacer holding members while the first elastic portion is elastically deformed in the vertical direction into elastic pressure contact with the first spacer support member.

This battery pack is arranged such that the battery modules are held by the holding spacer(s), and further the holding spacer(s) is held, or clasped, between the first and second spacer support members in the vertical direction. In such constructed battery pack, according to the present invention, the holding spacer includes the first elastic portion(s) formed to face the first spacer support member and to be elastically deformed in the vertical direction. This holding spacer is held between the first and second spacer support members while the first elastic portion(s) is elastically deformed in the vertical direction into elastic pressure contact with the first spacer support member. Accordingly, the holding spacer is elastically held between the first and second spacer support members. This makes it possible to effectively restrain the holding spacer from freely moving inside the battery pack, especially, from moving in the vertical direction, for a longer period than in conventional cases.

Here, the "battery module" has only to include a plurality of cells arranged in line, and is not particularly limited in configuration, shape, and others. For example, it may include any module constituent parts other than a cell. Further, the number of cells, the shape of a cell, and others included in the battery module are not particularly limited. For example, a rectangular cell or a cylindrical cell may be adopted.

The "holding spacer" is not particularly limited in shape, material, and others as long as the aforementioned requirements are satisfied. For example, an integrally molded spacer or a spacer constructed of several parts may be adopted. It may be made of resin or metal, or, partially made of resin or metal. The "first elastic portion" of the holding spacer is not particularly limited in shape, material, and others as long as the aforementioned requirements are satisfied.

The "first spacer support member" and the "second spacer support member" are not particularly limited in configuration, shape, and others if only the aforementioned requirements are satisfied. For example, if the battery pack is designed to include the battery module, holding spacer, and others which are housed in the battery pack case, part of the battery pack case may be formed as the first or second spacer support member.

Further, in the aforementioned battery pack, preferably, the first elastic portion is made of rubber.

According to the present invention, the first elastic portion is made of rubber. Rubber can stably keep elasticity for a long period as compared with metal, resin, etc. Accordingly, this can maintain an effect of restraining free movement of the holding spacer for a long period. Since the first elastic portion is made of rubber, furthermore, producing a large frictional force in a contact area between the first elastic portion and the first spacer support member, the holding spacer can be effectively restrained from moving in a direction perpendicular to the vertical direction. It should be noted that EPDM, fluorocarbon rubber, and silicone rubber are especially preferably used as the rubber materials in terms of durability, alkali-resistance, etc. The same applies to the case where a second elastic portion and a third elastic portion, which will be mentioned later, are made of rubber.

In any of the aforementioned battery packs, more preferably, the holding spacer includes one or more second elastic portions arranged to face the second spacer support member and to be elastically deformed in the vertical direction, and the holding spacer is elastically held between the first and second spacer holding members while the first elastic portion is elastically deformed in the vertical direction into elastic pressure contact with the first spacer support member and the second elastic portion is elastically deformed in the vertical direction into elastic pressure contact with the second spacer support member.

According to the present invention, the holding spacer also includes, besides the aforementioned first elastic portion(s), the second elastic portion(s) formed to face the second spacer support member and to be elastically deformed in the vertical direction. This holding spacer is held between the first and second spacer support members while the first elastic portion(s) is elastically deformed in the vertical direction into elastic pressure contact with the first spacer support member and simultaneously the second elastic portion(s) is elastically deformed in the vertical direction into elastic pressure contact with the second spacer support member. This makes it possible to more effectively restrain the holding spacer from freely moving inside the battery pack. It should be noted that this "second elastic portion" is not particularly limited in shape, material, and others, if only the aforementioned requirements are satisfied.

Further, in the aforementioned battery pack, preferably, the second elastic portion is made of rubber.

According to the present invention, the second elastic portion is made of rubber. As mentioned above, rubber can stably keep elasticity for a long period as compared with metal, resin, etc. Thus, an effect of restraining free movement of the holding spacer can be maintained for a long period. Since the second elastic portion is made of rubber, furthermore, producing a large frictional force in a contact area between the second elastic portion and the second spacer support member, the holding spacer can be effectively restrained from moving in a direction perpendicular to the vertical direction.

In any of the aforementioned battery packs, more preferably, the holding spacer includes a first module pressing portion and a second module support portion which hold the battery module in the vertical direction, wherein the first module pressing portion elastically presses the battery module in the vertical direction in association with the elastic deformation of the first elastic portion, and the second module support portion supports the battery module in the vertical direction, and the battery module is elastically held between the first module pressing portion and the second module support portion while the first module pressing portion elastically presses the battery module in the vertical direction.

According to the present invention, the holding spacer includes the first module pressing portion and the second module support portion which hold the battery module therebetween in the vertical direction. The battery module is elastically held between the first module pressing portion and the second module support portion while the first module pressing portion elastically presses the battery module in the vertical direction. Thus, the battery module is elastically held between the first module pressing portion and the second module support portion. This makes it possible to prevent the battery module from freely moving inside the battery pack, especially, from moving in the vertical direction. It should be noted that the "first module pressing portion" and the "second module support portion" are not particularly limited in shape, material, and others if only the aforementioned requirements are satisfied.

In the aforementioned battery pack, more preferably, the holding spacer includes a first module pressing portion and a second module pressing portion which hold the battery module in the vertical direction, wherein the first module pressing portion elastically presses the battery module in the vertical direction in association with the elastic deformation of the first elastic portion, and the second module pressing portion elastically presses the battery module in the vertical direction in association with the elastic deformation of the second elastic portion, and the battery module is elastically held between the first module pressing portion and the second module pressing portion while the first module pressing portion elastically presses the battery module in the vertical direction and the second module pressing portion also elastically presses the battery module in the vertical direction.

According to the present invention, the holding spacer includes the first module pressing portion and the second module pressing portion which hold the battery module therebetween in the vertical direction. The battery module is elastically held between the first module pressing portion and the second module pressing portion while the first and second module pressing portions elastically press the battery module in the vertical direction. Thus, the battery module is elastically held between the first and second module pressing portions. This makes it possible to more effectively prevent the battery module from freely moving inside the battery pack, especially, from moving in the vertical direction. It should be noted that the "second module pressing portion" is not particularly limited in shape, material, and others if only the afore mentioned requirements are satisfied.

In any of the aforementioned battery packs, preferably, the holding spacer includes one or more third elastic portions arranged to face the battery module which the third elastic portion itself holds and to be elastically deformed in the module arrangement direction, and the battery module is held by the holding spacer while the third elastic portion of the holding spacer is elastically deformed in the module arrangement direction into elastic pressure contact with the battery module.

According to the present invention, the holding spacer includes the third elastic portion(s) formed to face the battery module held by this holding spacer itself and to be elastically deformed in the module arrangement direction. The battery module is held by the holding spacer while the third elastic portion(s) of the holding spacer is elastically deformed in the module arrangement direction into elastic pressure contact with the battery module. Accordingly, the battery module is elastically held by the holding spacer. This makes it possible to restrain the battery module from freely moving inside the battery pack, especially, from moving in the module arrangement direction. It should be noted the "third elastic portion" is also not limited in shape, material, and others, as long as the aforementioned requirements are satisfied.

In the aforementioned battery pack, furthermore, the third elastic portion is preferably made of rubber.

According to the present invention, the third elastic portion is made of rubber. As mentioned above, rubber can stably keep elasticity for a long period as compared with metal, resin, etc. Thus, an effect of restraining free movement of the holding spacer can be maintained for a long period. Since the third elastic portion is made of rubber, furthermore, producing a large frictional force in a contact area between the third elastic portion and the battery module, the battery module can be effectively restrained from moving in the direction perpendicular to the module arrangement direction.

In any of the aforementioned battery packs, further, an outer surface of the battery module is preferably covered with a film.

In the battery pack in which the outer surface of the battery module is covered with the film, free movement of the battery module inside the battery pack may cause damages such as breaking or peeling of the film.

In the present invention, on the other hand, the battery module is held against free movement. Even where the outer surface of the battery module is covered with the film, damages such as breaking or peeling of the film can be prevented, achieving a highly reliable battery pack.

Another solving means is a battery pack comprising: a plurality of battery modules each including a plurality of cells arranged in line, the battery modules being arranged with a space therebetween in a module arrangement direction perpendicular to a cell arrangement direction in which the cells are arranged; and one or more holding spacers which are placed in the space between the battery modules and hold the battery modules; wherein the holding spacer includes one or more third elastic portions arranged to face the battery module which the third elastic portion itself holds and to be elastically deformed in the module arrangement direction, and the battery module is elastically held by the holding spacer while the third elastic portion of the holding spacer is elastically deformed in the module arrangement direction into elastic pressure contact with the battery module.

According to the present invention, the holding spacer includes the third elastic portion formed to face the battery module held by the holding spacer itself and to be elastically deformed in the module arrangement direction. The battery module is held by the holding spacer while the third elastic portion of the holding spacer is elastically deformed in the module arrangement direction into elastic pressure contact with the battery module. Thus, the battery module is elastically held by the holding spacer. This makes it possible to prevent the battery module from freely moving inside the battery pack, especially, from moving in the module arrangement direction.

In the aforementioned battery pack, more preferably, the third elastic portion is made of rubber.

According to the present invention, the third elastic portion is made of rubber. As mentioned above, rubber can stably keep elasticity for a long period as compared with metal, resin, etc. Thus, an effect of restraining free movement of the battery module can be maintained for a long period. Since the third elastic portion is made of rubber, furthermore, producing a large frictional force in a contact area between the third elastic portion and the battery module, the battery module can effectively be prevented from wobbling in a direction perpendicular to its arrangement direction.

Figure 1:
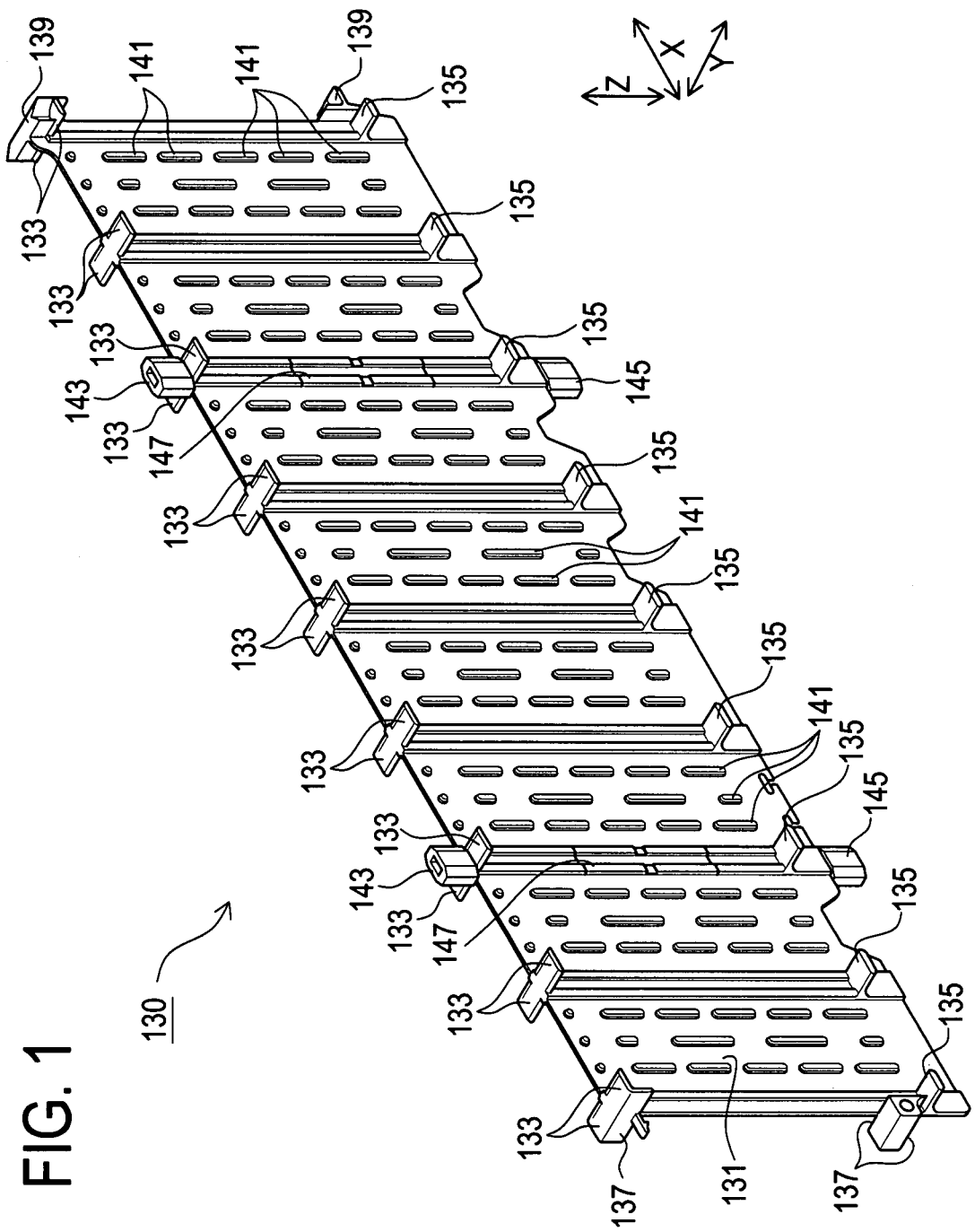
FIG. 1 is a perspective view showing a holding spacer of a battery pack of a first embodiment.

EXPLANATION OF REFERENCE CODES 100, 200, 300, 400, 500, 600 Battery pack
110, 210 Battery module
111 Cell
121, 221 Film
130, 230, 330, 430, 530, 630 Holding spacer
143, 243, 343 First elastic member (First elastic portion)
145, 245, 545 Second elastic member (Second elastic portion)
147, 247 Plate-like rubber member
147c, 247c Long side protrusion (Third elastic portion)
160 First spacer support member
170 Second spacer support member
333, 433 First module pressing portion
443 First elastic portion
535, 635 Second module pressing portion
645 Second elastic portion
X Cell arrangement direction
Y Module arrangement direction
Z Vertical direction

BEST MODE FOR CARRYING OUT THE INVENTION

First Embodiment

Figure 2:
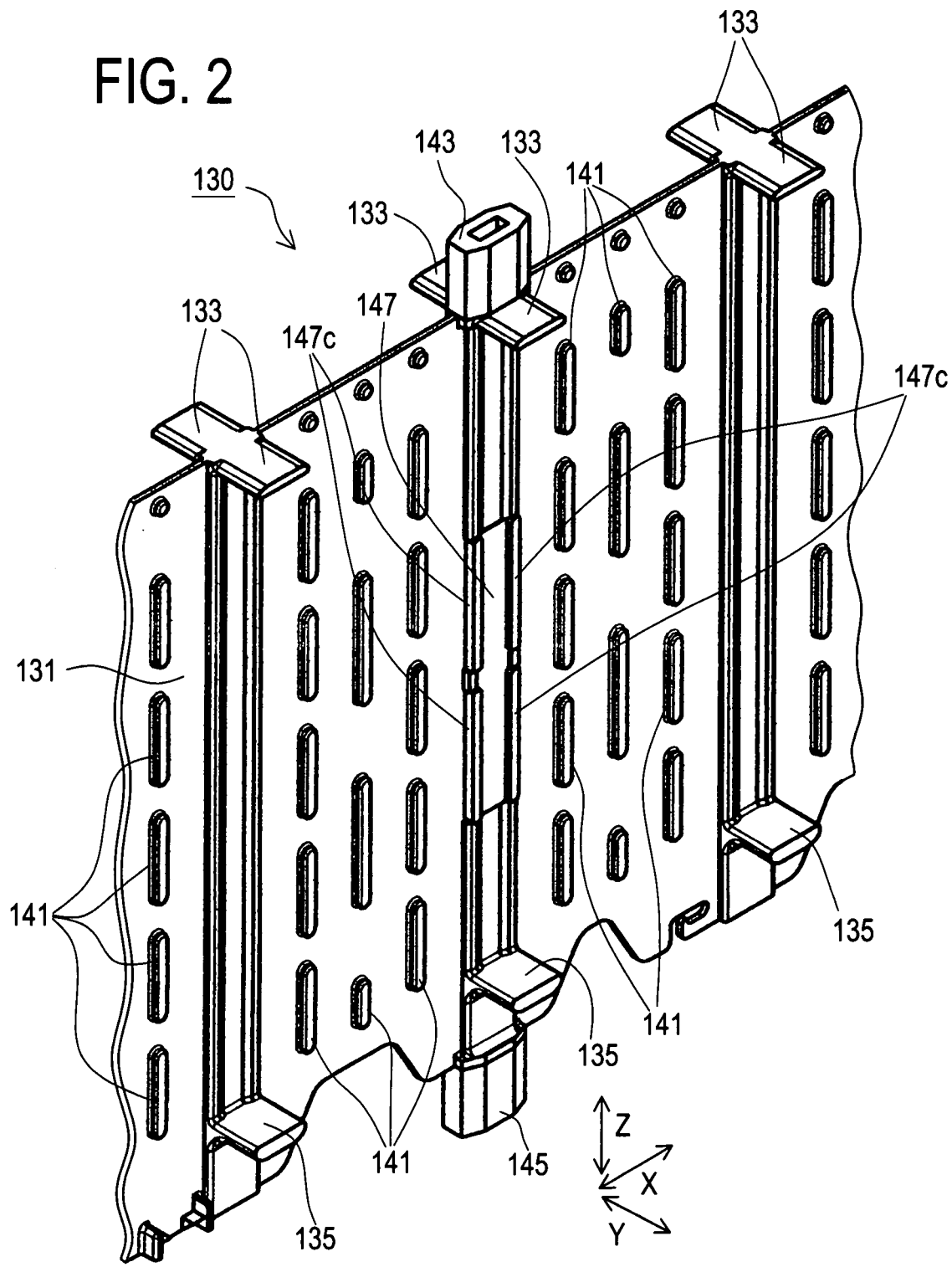
FIG. 2 is a partially perspective view showing part of the holding spacer of the battery pack of the first embodiment.
Figure 3:
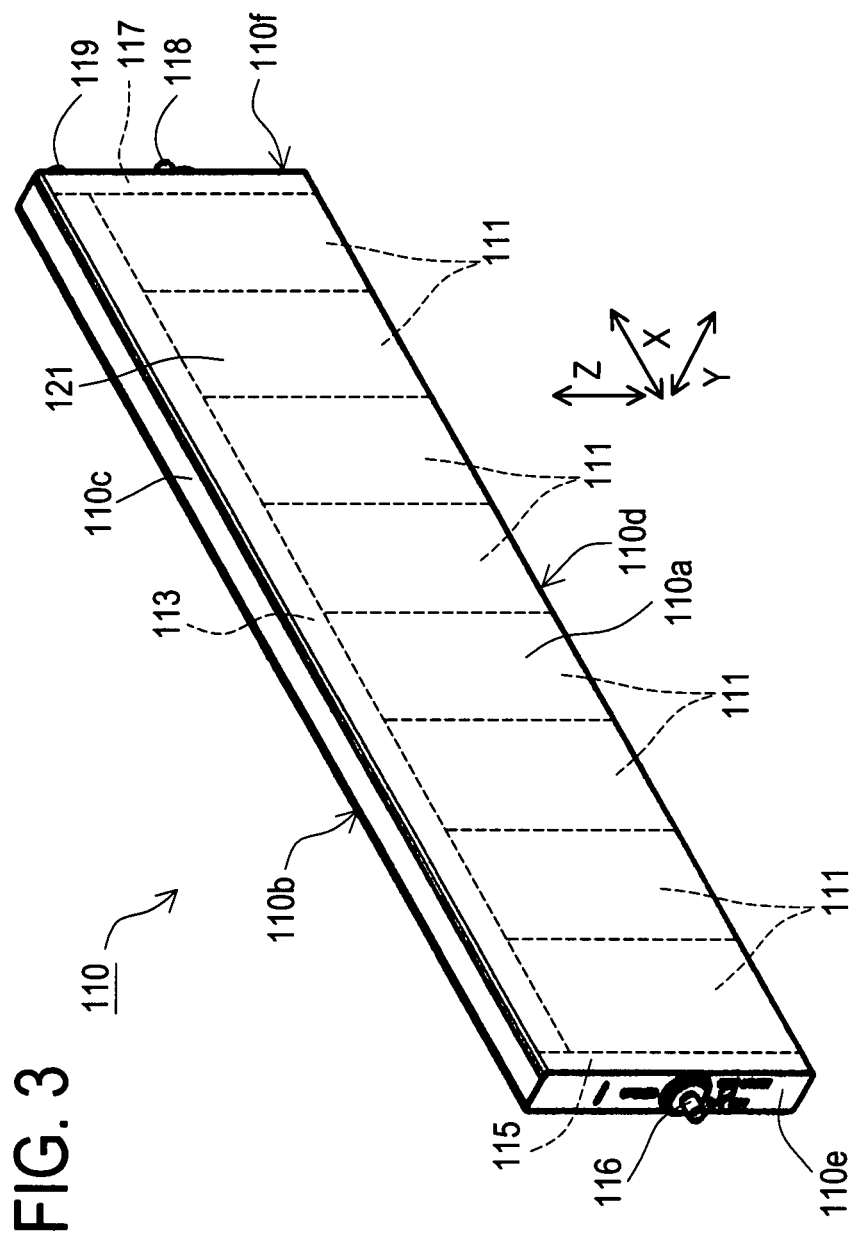
FIG. 3 is a perspective view showing a battery module of the battery pack of the first embodiment.
Figure 4:
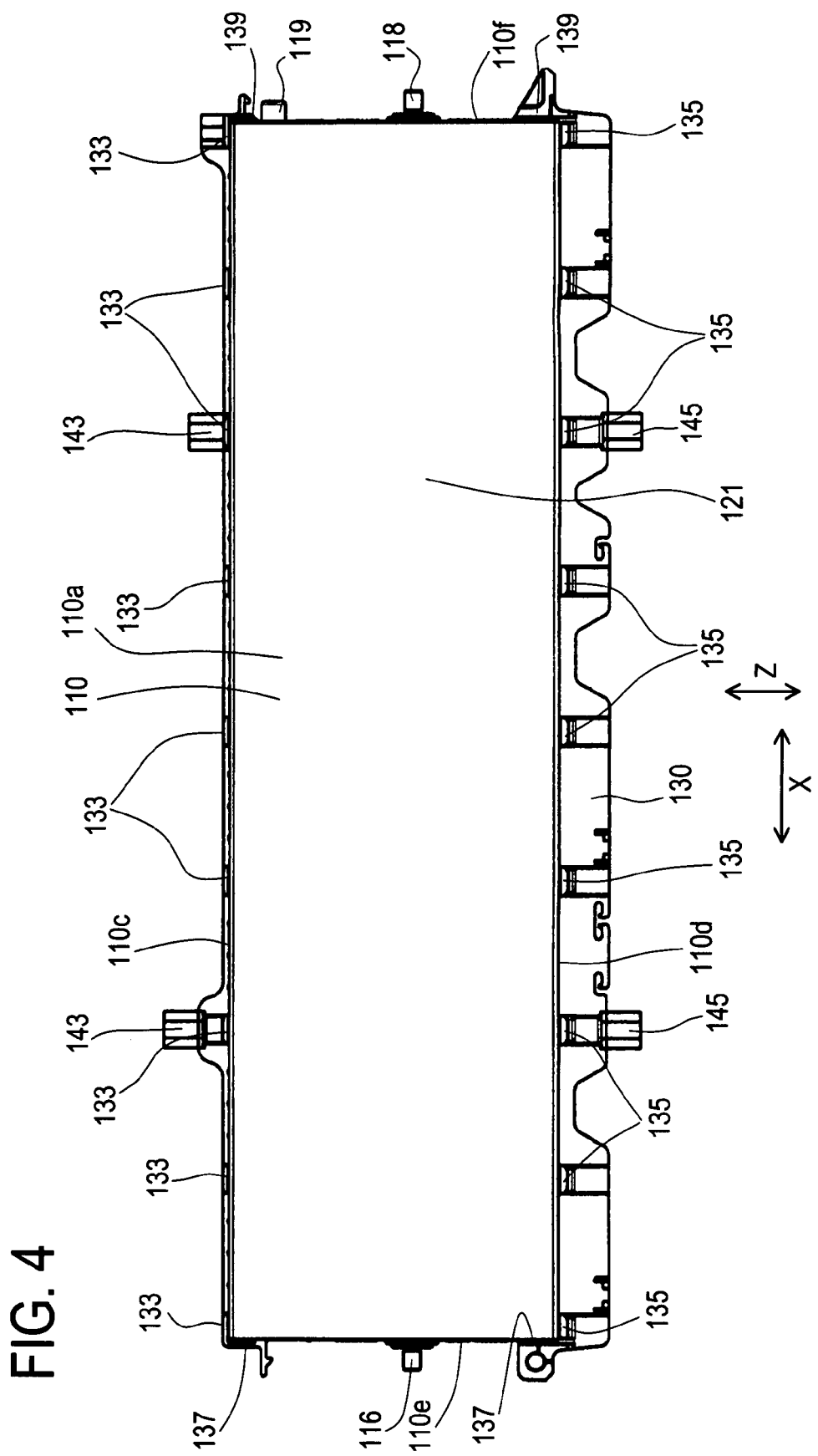
FIG. 4 is a plan view showing a state where the battery module is attached to the holding spacer, of the battery pack of the first embodiment.
Figure 5:
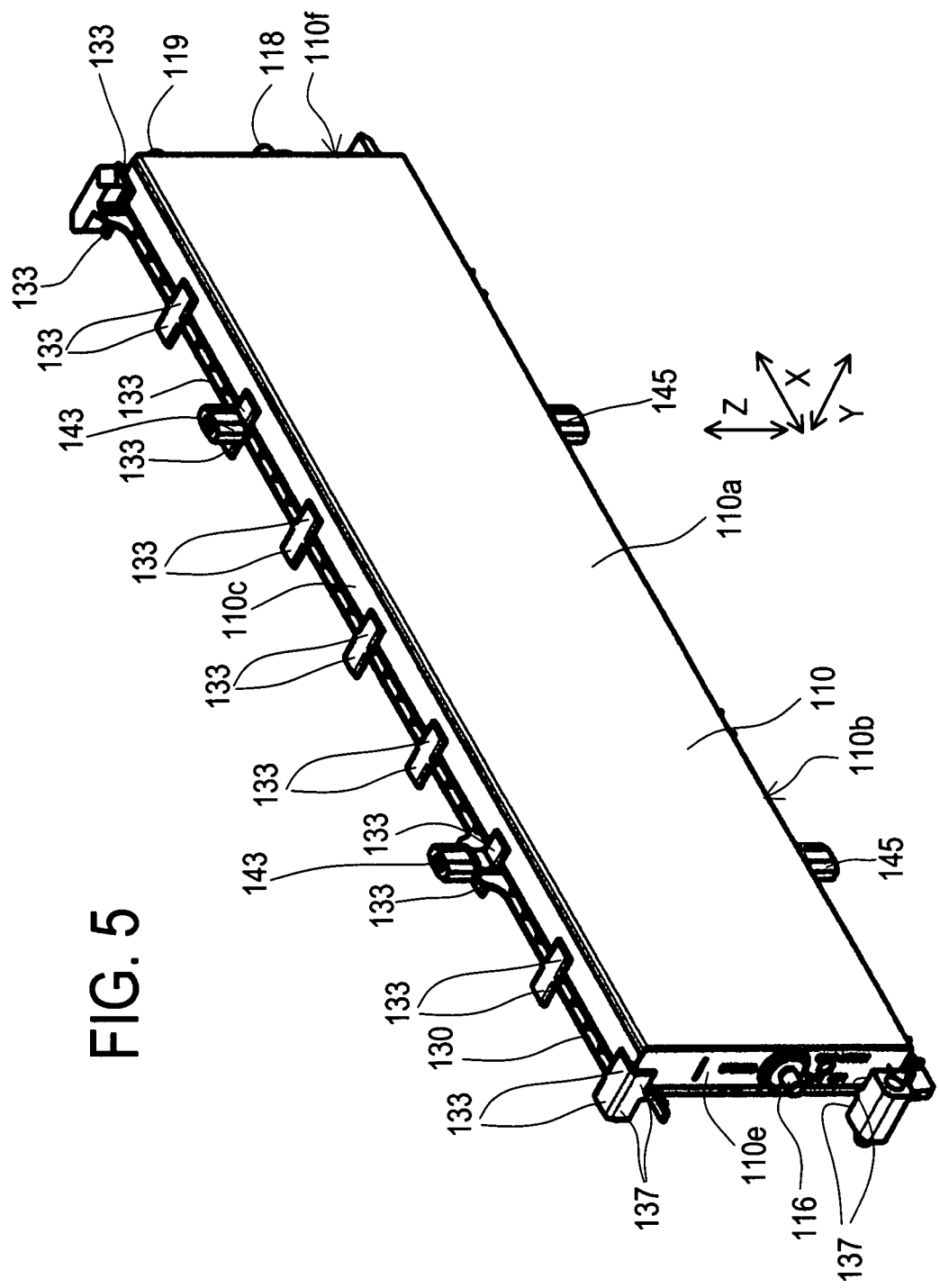
FIG. 5 is a perspective view showing a state where the battery module is attached to the holding spacer, of the battery pack of the first embodiment.
Figure 6:
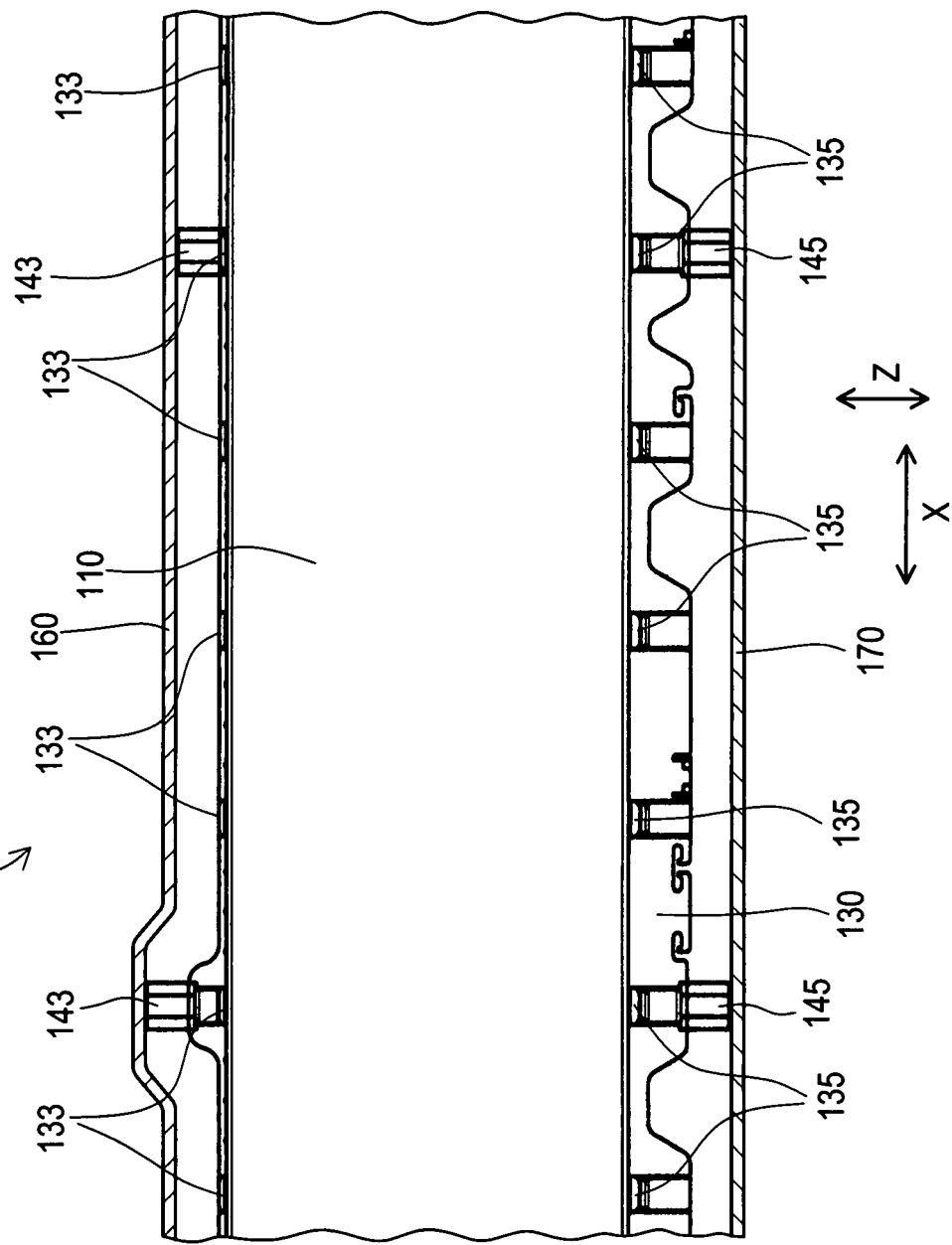
FIG. 6 is a partially sectional view showing part of the battery pack of the first embodiment.
Figure 7:
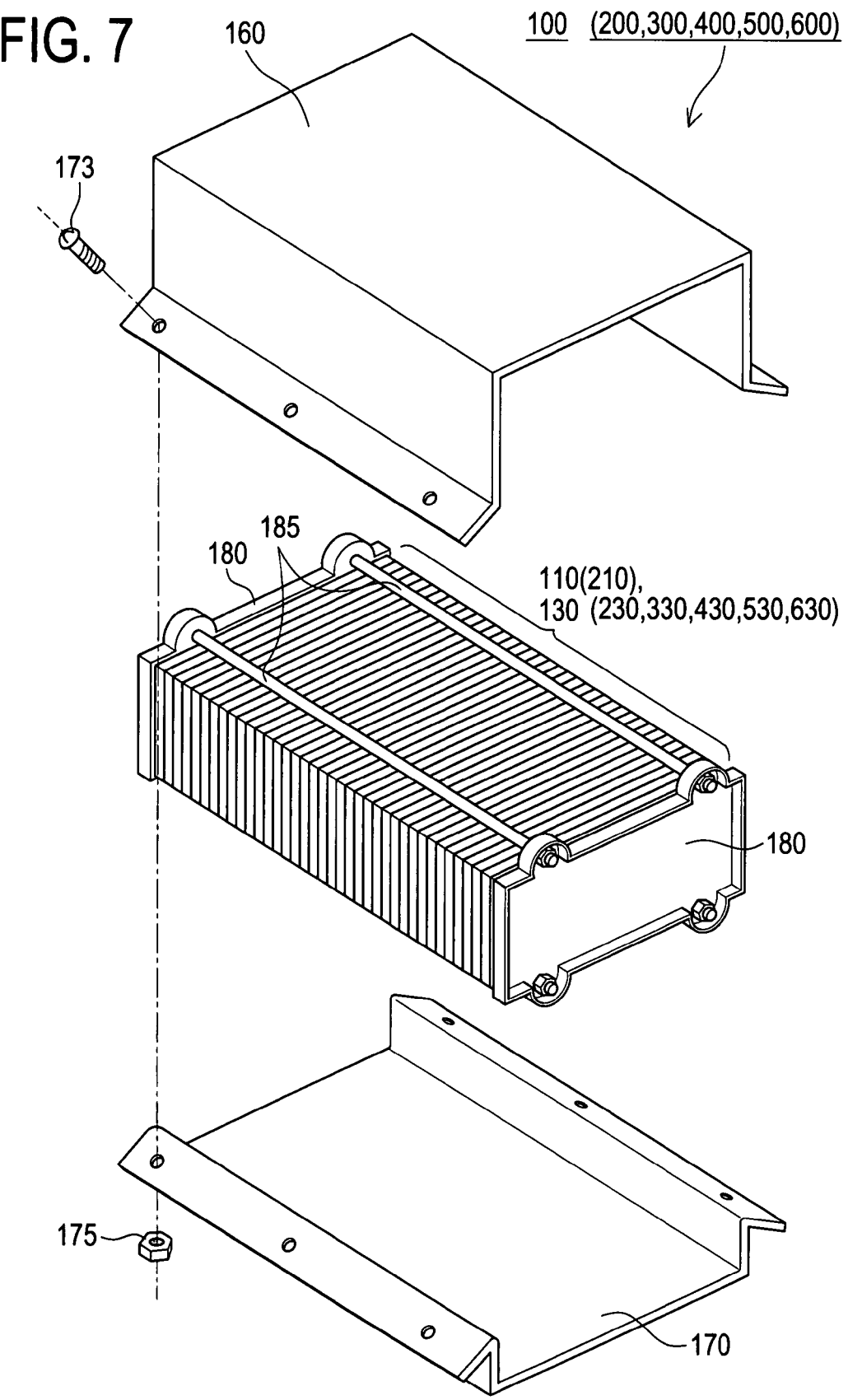
FIG. 7 is an explanatory view showing a schematic configuration of the battery pack of the first embodiment.

A first embodiment of the invention will be described below with reference to the accompanying drawings. FIGS. 1 and 2 show a holding spacer 130 included in a battery pack 100 of the first embodiment. FIG. 3 shows a battery module 110 included in the battery pack 100. FIGS. 4 and 5 show the state of the battery module 110 attached to the holding spacer 130. FIGS. 6 and 7 show the battery pack 100. In each figure, an arrangement direction of cells 111 in completion of the battery pack corresponds to a cell arrangement direction X; an arrangement direction of the battery modules 110 corresponds to a module arrangement direction Y; and a direction perpendicular to the above-mentioned directions to a vertical direction Z.

The battery pack 100 is a secondary battery (for example, a nickel-metal hydride storage battery) that is used as a power source for an electric vehicle or a hybrid car. The battery pack 100 includes a plurality of battery modules 110. Holding spacers 130 for holding the battery modules 110 are respectively placed in a space between the adjacent battery modules 110. Furthermore, these battery modules 110 and the holding spacers 130 are integrated by being entirely retained by two end plates 180 and four retaining rods 185 (see FIG. 7). The battery modules 110 and the holding spacers 130 are held by a first spacer support member (an upper case) 160 and a second spacer support member (a lower case) 170 (see FIGS. 6 and 7). The first spacer support member 160 and the second spacer support member 170 are fixed by bolts 173 and nuts 175 (see FIG. 7).

As shown in FIG. 3, each battery module 110 is formed in a substantially rectangular parallelepiped shape having two long sides 110a, 110b opposed to each other, two short sides 110c, 110d opposed to each other, and two end surfaces 110e, 110f opposed to each other. The battery module 110 includes a plurality of cells 111 (eight cells in this embodiment) arranged in line from the left front side to the right rear side in FIG. 3. Each cell 111 is a battery of a substantially rectangular parallelepiped shape. The cells 111 are connected in series with safety valves (not shown) directed toward the short side 110c (upward in FIG. 3).

An upper cover member 113 having a U-shaped section is placed on the short side 110c (on the upper side in FIG. 3) of the connected cells 111 to cover the respective safety valves so as to constitute a gas exhaust passage between the cover member and cell cases. A negative electrode side cover member 115 is placed on the end surface 110e side (on the left front side in FIG. 3) of the arranged cells 111. A positive electrode side cover member 117 is placed on the end surface 110f side (on the right rear side in FIG. 3) of the cells 111. An external negative terminal 116 protruding outside the module is placed at the substantial center of the negative electrode side cover member 115, and is electrically connected to a negative electrode of the cell 111 located on one end (on the left side in FIG. 3) inside the module. In contrast, an external positive terminal 118 protruding outside the module is placed at the substantial center of the positive electrode side cover member 117, and is electrically connected to a positive electrode of the cell 111 located on the other end (on the right side in FIG. 3) inside the module. Further, in the upper part of the positive electrode side cover member 117 (on the upper side in FIG. 3), an exhaust port 119 is provided to be in communication with a gas exhaust passage constructed between the upper cover member 113 and each battery case.

The long sides 110a, 110b, and the short sides 110c, 110d of the outer surfaces of the battery module 110, except for the end surfaces 110e, 110f, are covered with a film 121. The film 121 is wound around an axis line along the arrangement direction (the cell arrangement direction) X of the cells 111 in the cell module 110. This film 121 hermetically seals spaces between the cells 111, between the cell 111 and the upper cover member 113, between the cell 111 and the negative electrode side cover member 115, between the cell 111 and the positive electrode side cover member 117, between the upper cover member 113 and the negative electrode side cover member 115, and between the upper cover member 113 and the positive electrode side cover member 117.

Now, the holding spacer 130 will be described with reference to FIGS. 1, 2, 4 to 6. Other parts of the holding spacer 130, except for a first elastic member (a first elastic portion) 143, a second elastic member (a second elastic portion) 145, and a plate-like rubber member 147, which will be described later, are integrally made of resin having electrical insulating properties. The holding spacer 130 is placed in a space between the battery modules 110 to hold the battery modules 110, while constituting cooling passages through which a cooling medium passes between the battery modules 110 and the holding spacer 130.

More specifically, the holding spacer 130 has a spacer body 131 having a substantially plate-like shape and directly intervening in the space between the adjacent battery modules 110. A plurality of first module support portions 133 (nine support portions on each side, that is, eighteen support portions in total) are provided on one end of the spacer body 131 in the vertical direction Z (on the upper end in FIGS. 1 and 2) for supporting the short side 110c of the adjacent battery module 110. These first module support portions 133 respectively protrude in the module arrangement direction Y to have a plate-like shape perpendicular to the vertical direction Z. A plurality of second module support portions 135 (nine support portions on each side, that is, eighteen support portions in total) are provided on the other end of the spacer body 131 in the vertical direction (on the lower end in FIGS. 1 and 2) for supporting the short side 110d of the adjacent battery module 110. Also, these second module support portions 135 respectively protrude in the module arrangement direction Y to have a plate-like shape perpendicular to the vertical direction Z. The battery modules 110 attached to the holding spacer 130 are placed between the first module support portions 133 and the second module support portions 135 to be restrained from moving in the vertical direction Z.

A plurality of third module support portions 137 (two support portions on each side, that is, four support portions in total) are provided on one end of the spacer body 131 in the cell arrangement direction X (on the left front end in FIG. 1) for supporting the end surface 110e or 110f of the adjacent battery module 110. These third module support portions 137 respectively protrude in the module arrangement direction Y. A plurality of fourth module support portions 139 (two support portions on each side, that is, four support portions in total) are provided on the other end of the spacer body 131 in the cell arrangement direction X (on the right rear end in FIG. 1) for supporting the end surface 110e or 110f of the adjacent battery module 110. Also, these fourth module support portions 139 respectively protrude in the module arrangement direction Y. The battery modules 110 attached to the holding spacer 130 are placed between the third module support portions 137 and the fourth module support portions 139 to be restrained from moving in the cell arrangement direction X.

The spacer body 131 is provided with a number of cooling passage forming protrusions 141 for forming the cooling passages through which the cooling medium passes between the long sides 110a and 110b of the adjacent battery modules. These cooling passage forming protrusions 141 protrude in the module arrangement direction Y and extend linearly in the vertical direction Z. The long sides 110a and 110b of the battery modules 110 attached to the holding spacer 130 are respectively abutted against the cooling passage forming protrusions 141, thereby to construct the cooling passages between the long sides 110a, 110b and the spacer body 131.

A plurality (Two) of first elastic members (first elastic portions) 143 which are abutted against the first spacer support member 160 are provided on one end of the spacer body 131 in the vertical direction Z (on the upper end in FIGS. 1 and 2). Each first elastic member 143 has a flat octagonal cylindrical shape, and is fitted on a protruding portion not shown on the upper end of the spacer body 131 to be fixed to the spacer body 131 so as to protrude in the vertical direction Z. The first elastic member 143 is entirely made of rubber, and elastically deformable in the vertical direction Z.

A plurality (Two) of second elastic members (second elastic portions) 145 which are abutted against the second spacer support member 170 are provided on the other end of the spacer body 131 in the vertical direction Z (on the lower end in FIGS. 1 and 2). Each second elastic member 145 also has a flat octagonal cylindrical shape, and is fitted on a protruding portion not shown on the lower end of the spacer body 131 to be fixed to the spacer body 131 so as to protrude in the vertical direction Z. The second elastic member 145 is also entirely made of rubber, and elastically deformable in the vertical direction Z.

The holding spacer 130 in the constructed battery pack 100 (see FIG. 6) is provided with the first elastic members 143 elastically deformed (elastically compressed) in the vertical direction Z to be in elastic pressure contact with the first spacer support member 160, and with the second elastic members 145 elastically deformed (elastically compressed)

in the vertical direction Z to be in elastic pressure contact with the second spacer support member 170. Thus, the holding spacers 130 are elastically clasped between the first spacer support member 160 and the second spacer support member 170. This can restrain the holding spacers 130 from freely moving inside the battery pack 100, particularly, in the vertical direction Z effectively for a long period, as compared with the conventional case.

The first elastic member 143 and the second elastic member 145 are made of rubber, and thus can maintain elasticity stably for a long period, as compared with those made of metal or resin. Thus, the effect of restraining free movement of the holding spacers 130 can be maintained for a long period. Furthermore, since the first elastic member 143 and the second elastic member 145 are made of rubber, a large frictional force is caused in a contact area between the first elastic member 143 and the first spacer support member 160 and a frictional force in a contact area between the second elastic member 145 and the second support member 170. Thus, the holding spacers 130 can be effectively restrained from moving in the direction perpendicular to the vertical direction Z (for example, in the cell arrangement direction X and the module arrangement direction Y).

A plurality of plate-like rubber members 147 (two rubber members on each side, that is, four rubber members in total) are provided in the spacer body 131. The plate-like rubber member 147 has a long rectangular shape extending in the vertical direction Z, and long side protrusions (third elastic portions) 147c are formed to protrude in the module arrangement direction Y. The plate-like rubber member 147 is fitted in a rectangular through hole formed in the spacer body 131 to be fixed to the spacer body 131. The plate-like rubber member 147 is entirely made of rubber, and each long side protrusion 147c can be elastically deformed in the module arrangement direction Y. The battery modules 110 attached to the holding spacer 130 are held by the holding spacer 130 with the plate-like rubber members 147 (long side protrusions 147c) elastically deformed in the module arrangement direction Y to be in elastic pressure contact with the long side 110a or the long side 110b of the battery module 110. Thus, the battery modules 110 can be elastically held by the holding spacer 130. This can restrain the battery modules 110 from freely moving inside the battery pack 100, particularly, in the module arrangement direction Y.

The plate-like rubber member 147 (the long side protrusions 147c) is made of rubber, and thus can maintain elasticity stably for a long period, as compared with that made of metal or resin. Thus, the effect of restraining free movement of the battery modules 110 can be maintained for a long period. Furthermore, since the plate-like rubber member 147 (the long side protrusions 147c) is made of rubber, a large frictional force is caused in a contact area between the long side protrusions 147c and the long sides 110a, 110b of the battery modules 110. Thus, the battery modules 110 can be effectively restrained from moving in the direction perpendicular to the module arrangement direction Y (for example, in the cell arrangement direction X and the vertical direction Z).

In this first embodiment, the plate-like rubber member 147 (long side protrusion 147c) is located in the same position in the cell arrangement direction X as that of the first elastic member 143 and the second elastic member 145, and at the center in the vertical direction Z between the first elastic member 143 and the second elastic member 145. Thus, the plate-like rubber members 147 (the long side protrusions 147c) hold the battery modules 110 at positions corresponding to parts of the holding spacer 130 held in contact with the first and second spacer support members 160 and 170. This can securely hold the battery modules 110.

The battery module 110 of this embodiment has its outer surface covered with the film 121 as mentioned above. Thus, if the battery module 110 freely moves inside the battery pack 100, the film 121 may be disadvantageously damaged, e.g. broken or peeled, due to the free movement. However, in this embodiment, the battery modules 110 are restrained from freely moving inside the battery pack 100 as mentioned above, which can restrain the damages such as breaking or peeling of the film 121.

The battery pack 100 is manufactured as follows. That is, the cells 111 manufactured by a known method are connected in series and arranged in line (see FIG. 3). Thereafter, the upper cover member 113, the negative electrode side cover member 115, and the positive electrode side cover member 117 are arranged in respective predetermined positions, and these components are covered and sealed with the film 121, resulting in the completed battery module 110. On the other hand, the holding spacers 130 are prepared (see FIGS. 1 and 2). Each holding spacer 130 may be formed by attaching the first elastic members 143, the second elastic members 145 and the plate-like rubber members 147, which are made of rubber, at respective predetermined positions of the spacer body 131 made of resin. Then, the battery modules 110 are arranged with the holding spacers 130 placed in the spaces between the modules. Thereafter, the battery modules 110 and the holding spacers 130 are entirely retained from the outside and integrated by the end plates 180 and the retaining rods 185 (see FIG. 7). Furthermore, the battery modules 110 and the holding spacers 130 are held between the first spacer support member 160 and the second spacer support member 170, thus completing the battery pack 100.

Second Embodiment

Figure 8:
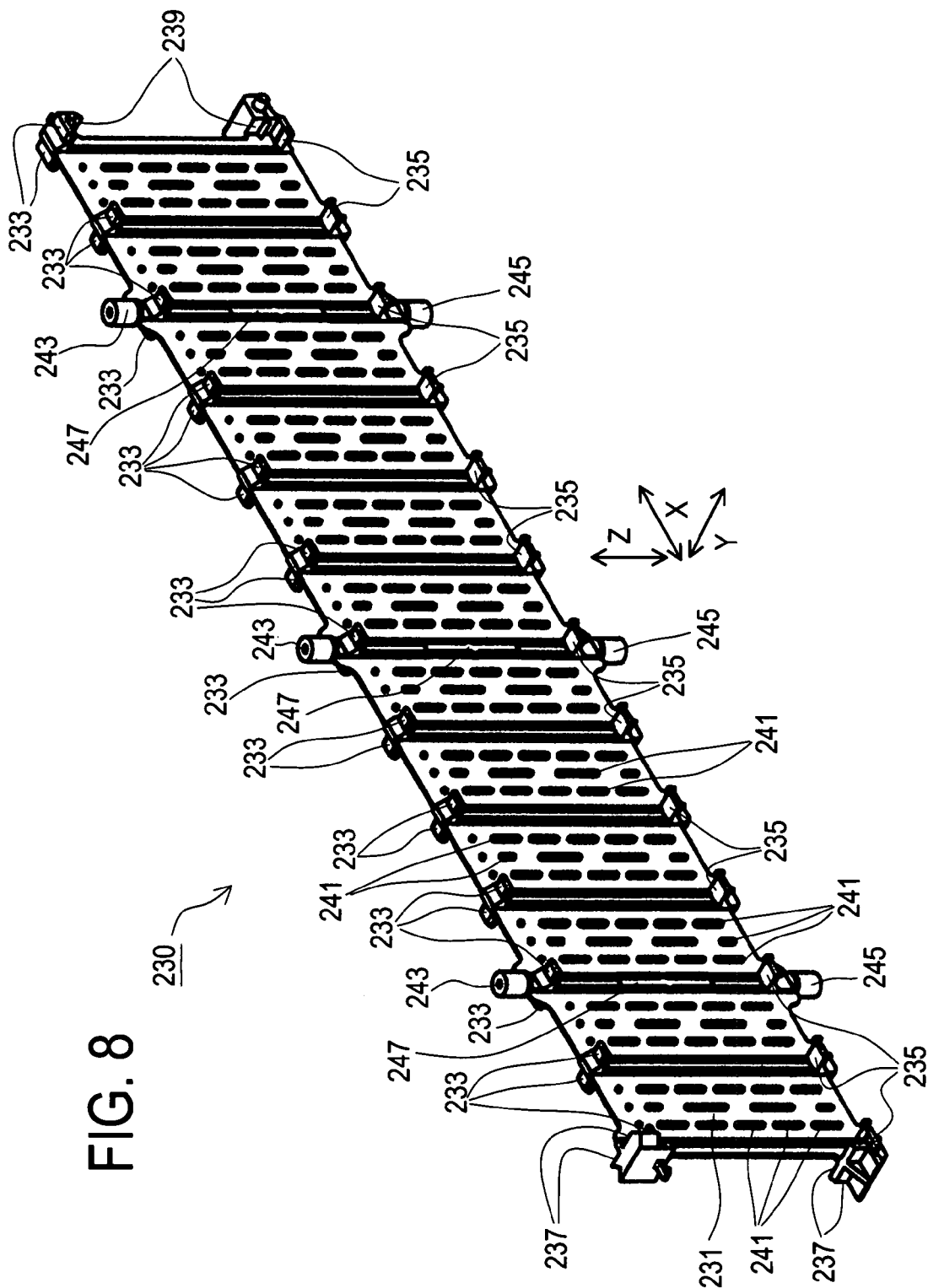
FIG. 8 is a perspective view showing a holding spacer of a battery pack of a second embodiment.
Figure 9:
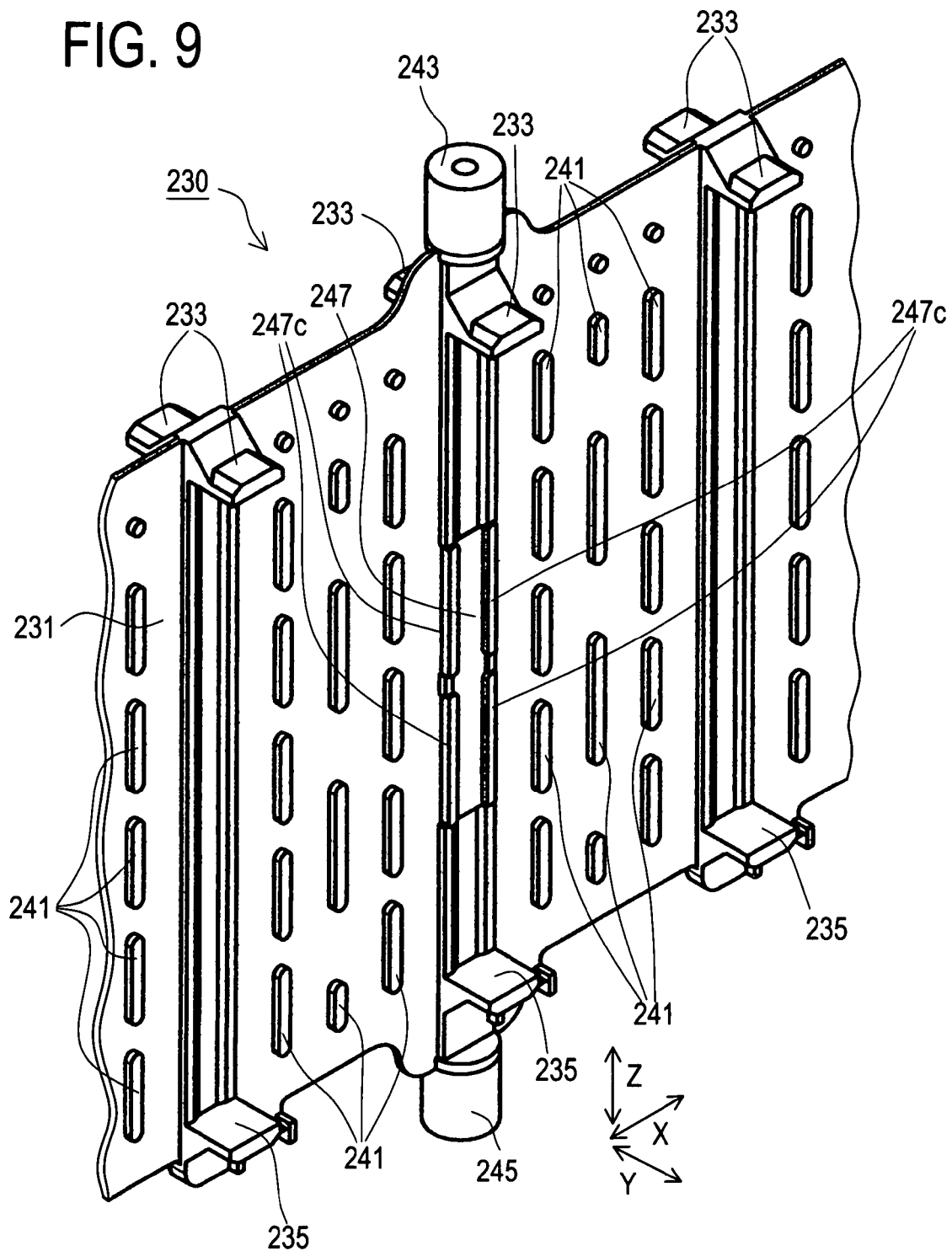
FIG. 9 is a partially perspective view showing part of the holding spacer of the battery pack of the second embodiment.
Figure 10:
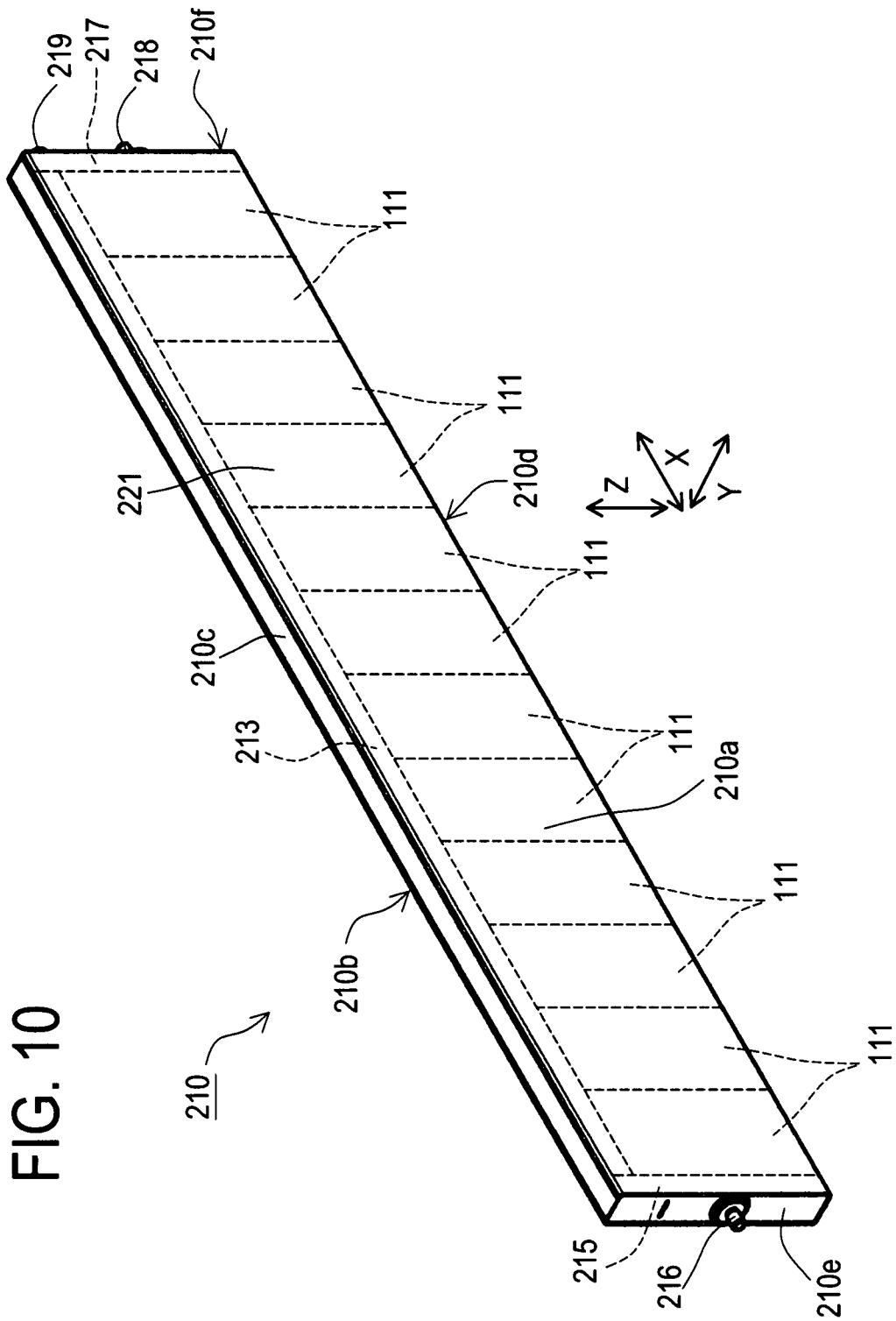
FIG. 10 is a perspective view showing a battery module of the battery pack of the second embodiment.

Next, a second embodiment of the invention will be described below. The description of the same parts as those of the first embodiment will be omitted or simplified. FIGS. 8 and 9 show a holding spacer 230 included in a battery pack 200 of the second embodiment. FIG. 10 shows a battery module 210 included in the battery pack 200 of the second embodiment. In each figure, an arrangement direction of the cells 111 in completion of the battery pack corresponds to the cell arrangement direction X; an arrangement direction of the battery modules 210 to the module arrangement direction Y; and a direction perpendicular to the above-mentioned directions to the vertical direction Z.

The battery pack 200 of the second embodiment differs from the battery pack 100 of the first embodiment in the following aspect. That is, each battery module 110 in the battery pack 100 of the first embodiment includes eight cells 111. In contrast, each battery module 210 in the battery pack 200 of the second embodiment includes twelve cells 111. The second embodiment slightly differs from the first embodiment in form of the holding spacer 230 for holding the modules and of other components, as well as in form of the battery module 210. The structure of the battery pack 200 itself is the same as that of the battery pack 100 of the first embodiment.

As shown in FIG. 10, each battery module 210 is formed in a substantially rectangular parallelepiped shape having two long sides 210a, 210b opposed to each other, two short sides 210c, 210d opposed to each other, and two end surfaces 210e, 210f opposed to each other. The battery module 210 includes twelve cells 111 arranged in line from the left front side to the right rear side in FIG. 10. The cells 111 are respectively connected in series with safety valves (not shown) directed toward the short side 210c (upward in FIG. 10).

An upper cover member 213 having a U-shaped section is provided on the short side 210c (on the upper side in FIG. 10) of the connected cells 111, as in the first embodiment. A negative electrode side cover member 215 is placed on the end surface 210e side (on the left front side in FIG. 10) of the arranged cells 111. A positive electrode side cover member 217 is placed on the end surface 210f side (on the right rear side in FIG. 10) of the cells 111. An external negative terminal 216 protruding outside the module is placed at the substantial center of the negative electrode side cover member 215. In contrast, an external positive terminal 218 protruding outside the module is placed at the substantial center of the positive electrode side cover member 217. Further, an exhaust port 219 in communication with a gas exhaust passage is provided at the upper part of the positive electrode side cover member 217. The long sides 210a, 210b, and the short sides 210c, 210d of the outer surfaces of the battery module 210, except for the end surfaces 210e, 210f, are covered with a film 221.

Now, the holding spacer 230 will be described with reference to FIGS. 8 and 9. The holding spacer 230 has a spacer body 231 having a substantially plate-like shape and directly intervening in the space between the adjacent battery modules 210. A plurality of first module support portions 233 (thirteen support portions on each side, that is, twenty six support portions in total) are provided on one end of the spacer body 231 in the vertical direction Z (on the upper end in FIGS. 8 and 9) for supporting the short side 210c of the adjacent battery module 210. These first module support portions 233 respectively protrude in the module arrangement direction Y to have a plate-like shape perpendicular to the vertical direction Z. A plurality of second module support portions 235 (thirteen support portions on each side, that is, twenty six support portions in total) are provided on the other end of the spacer body 231 in the vertical direction Z (on the lower end in FIGS. 8 and 9) for supporting the short side 210d of the adjacent battery module 210. Also, these second module support portions 235 respectively protrude in the module arrangement direction Y to have a plate-like shape perpendicular to the vertical direction Z. The battery modules 210 held by the holding spacer 230 are placed between the first module support portions 233 and the second module support portions 235 to be restrained from moving in the vertical direction Z.

A plurality of third module support portions 237 (two support portions on each side, that is, four support portions in total) are provided on one end of the spacer body 231 in the cell arrangement direction X (on the left front end in FIG. 8) for supporting the end surface 210e or 210f of the adjacent battery module 210. These third module support portions 237 respectively protrude in the module arrangement direction Y. A plurality of fourth module support portions 239 (two support portions on each side, that is, four support portions in total) are provided on the other end of the spacer body 231 in the cell arrangement direction X (on the right rear end in FIG. 8) for supporting the end surface 210e or 210f of the adjacent battery module 210. Also, these fourth module support portions 239 respectively protrude in the module arrangement direction Y. The battery modules 210 attached to the holding spacer 230 are placed between the third module support portions 237 and the fourth module support portions 239 to be restrained from moving in the cell arrangement direction X.

The spacer body 231 is provided with a number of cooling passage forming protrusions 241, like the first embodiment. These cooling passage forming protrusions 241 protrude in the module arrangement direction Y and extend linearly in the vertical direction Z. The long sides 210a and 210b of the battery modules 210 attached to the holding spacer 230 are respectively abutted against the cooling passage forming protrusions 241, thereby to construct the cooling passages between the long sides 210a, 210b and the spacer body 231.

A plurality (Three) of first elastic members (first elastic portions) 243 abutted against a first spacer support member (not shown) which is the same as the first spacer support member 160 of the first embodiment are provided on one end of the spacer body 231 in the vertical direction Z (on the upper end in FIGS. 8 and 9). The first elastic member 243 has a cylindrical shape, and is fitted on a protruding portion not shown on the upper end of the spacer body 231 to be fixed to the spacer body 231 so as to protrude in the vertical direction Z. The first elastic member 243 is entirely made of rubber, and elastically deformable in the vertical direction Z.

A plurality (Three) of second elastic members (second elastic portions) 245 abutted against a second spacer support member (not shown) which is the same as the second spacer support member 170 of the first embodiment are provided on the other end of the spacer body 231 in the vertical direction Z (on the lower end in FIGS. 8 and 9). The second elastic member 245 also has a cylindrical shape, and is fitted on a protruding portion not shown on the lower end of the spacer body 231 to be fixed to the spacer body 231 so as to protrude in the vertical direction Z. The second elastic member 245 is entirely made of rubber, and elastically deformable in the vertical direction Z.

The holding spacer 230 in the constructed battery pack 200 is provided with the first elastic members 243 elastically deformed (elastically compressed) in the vertical direction Z to be in elastic pressure contact with the first spacer support member, and with the second elastic members 245 elastically deformed (elastically compressed) in the vertical direction Z to be in elastic pressure contact with the second spacer support member. Thus, the holding spacer is elastically clasped between the first and second spacer support members. This can restrain the holding spacers 230 from freely moving inside the battery pack 200, particularly, in the vertical direction Z effectively for a long period, as compared with the conventional case.

A plurality of plate-like rubber members 247 (three rubber members on each side, that is, six rubber members in total) are provided in the spacer body 231. Each plate-like rubber member 247 has a long rectangular shape extending in the vertical direction Z, as with the plate-like rubber member 147 of the first embodiment, and long side protrusions (third elastic portions) 247c are formed to protrude in the module arrangement direction Y. The battery modules 210 attached to the holding spacer 230 are held by the holding spacer 230 with the plate-like rubber members 247 (the long side protrusions 247c) elastically deformed in the module arrangement direction Y to be in elastic pressure contact with the long side 210a or the long side 210b of the battery module 210. Thus, the battery modules 210 are elastically held by the holding spacers 230. This can restrain the battery modules 210 from freely moving inside the battery pack 200, particularly, in the module arrangement direction Y.

The same parts as those of the above-mentioned first embodiment have the same effects and advantages as those of the first embodiment.

Third Embodiment

Figure 11:
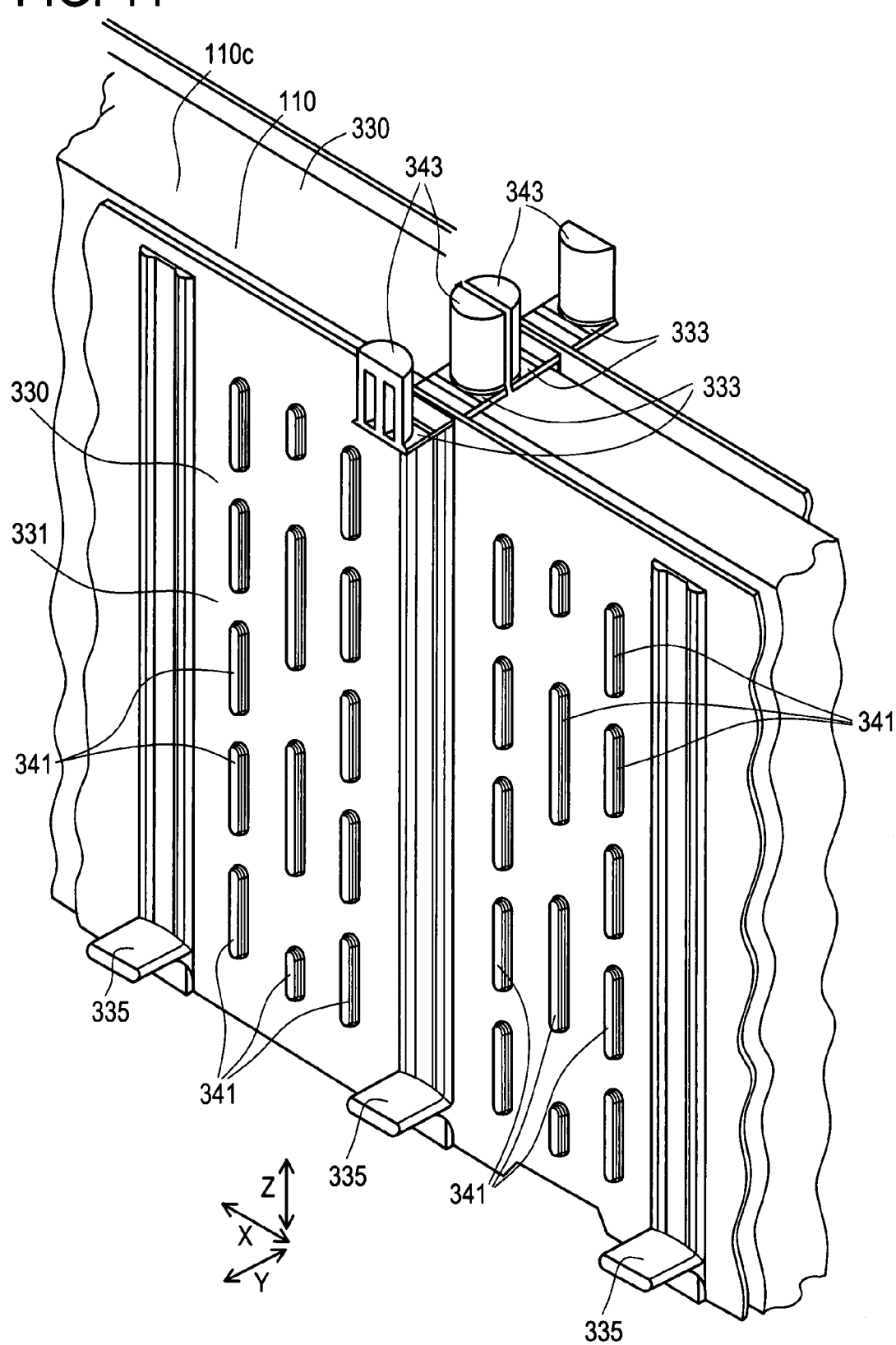
FIG. 11 is a partially perspective view showing part of a holding spacer of a battery pack of a third embodiment.

Next, a third embodiment of the invention will be described below. The description of the same parts as those of the first or second embodiment will be omitted or simplified. FIG. 11 shows a holding spacer 330 included in a battery pack 300 of the third embodiment. In FIG. 11, the direction from the upper left side to the lower right side corresponds to the cell arrangement direction X; the direction from the upper right side to the lower left side to the module arrangement direction Y; and the direction perpendicular to the above-mentioned directions to the vertical direction Z. The structure of the holding spacer 330 of the battery pack 300 in this embodiment is different from those of the holding spacers 130 and 230 of the battery pack 100 and the like in the above first and second embodiments. Other parts of this embodiment are basically the same as those of the first embodiment.

The holding spacer 330 according to the third embodiment has a spacer body 331 having a substantially plate-like shape and directly intervening in the space between the adjacent battery modules 110. A plurality of first module pressing portions 333 are provided on one end of the spacer body 331 in the vertical direction Z (on the upper end in FIG. 11) for elastically pressing against the short side 110c of the battery module 110 in the vertical direction Z, instead of the first module support portions 133, 233 of the first and second embodiments. These first module pressing portions 333 respectively protrude in the module arrangement direction Y to have a plate-like shape perpendicular to the vertical direction Z. A plurality of second module support portions 335 are provided on the other end of the spacer body 331 in the vertical direction Z (on the lower end in FIG. 11) for supporting the short side 110d of the battery module 110 in the vertical direction Z, as in the first and second embodiments. Also, these second module support portions 335 respectively protrude in the module arrangement direction Y to have a plate-like shape perpendicular to the vertical direction Z.

The first module pressing portions 333 are placed on the base ends of first elastic members (first elastic portions) 343 to be described later, in such a manner as to be deformable with the elastic deformation of the first elastic members 343 in the vertical direction Z to elastically press against the short side 110c of the battery module 110 in the vertical direction Z. The battery module 110 is elastically clasped between the first module pressing portions 333 and the second module support portions 335 with the first module pressing portions 333 elastically pressing against the short side 110c of the battery module 110 in the vertical direction Z. Thus, the battery modules 110 are elastically held between the first module pressing portions 333 and the second module support portions 335. This can effectively restrain the battery modules 110 from freely moving in the battery pack 300, in particularly, in the vertical direction Z.

A plurality of third module support portions and fourth module support portions (not shown) are respectively provided on both ends in the cell arrangement direction X of the spacer body 331, as in the above first and subsequent embodiments. The battery module 110 is placed between the third module support portions and the fourth module support portions to be restrained from moving in the cell arrangement direction X. The spacer body 331 is provided with a number of cooling passage forming protrusions 341 for forming cooling passages through which the cooling medium passes between the long sides 110a and 110b of the adjacent modules, as in the first embodiment.

A plurality of first elastic members (first elastic portions) 343 which are abutted against the first spacer support member 160 (see FIG. 6) are provided on one end of the spacer body 331 in the vertical direction Z (on the upper end in FIG. 11). The first elastic member 343 protrudes from the tip of the first module pressing portion 333 in the vertical direction Z. The first elastic member 343 has a semi-cylindrical shape, and faces another first elastic member 343 corresponding to the adjacent holding spacer 330 to construct a protrusion portion having a substantially cylindrical shape. The first elastic member 343 is entirely made of rubber, and elastically deformable in the vertical direction Z.

The holding spacers 330 are elastically clasped between the first spacer support member 160 and the second spacer support member 170 with the first elastic members 343 elastically deformed in the vertical direction Z to be in elastic pressure contact with the first spacer support member 160. Thus, the holding spacers 330 are elastically held between the first spacer support member 160 and the second spacer support member 170. This can restrain the holding spacers 330 from freely moving inside the battery pack 300, particularly, in the vertical direction Z effectively for a long period, as compared with the conventional case.

The same parts as those of the above-mentioned first or second embodiment have the same effects and advantages as those of the first or second embodiment.

Fourth Embodiment

Figure 12:
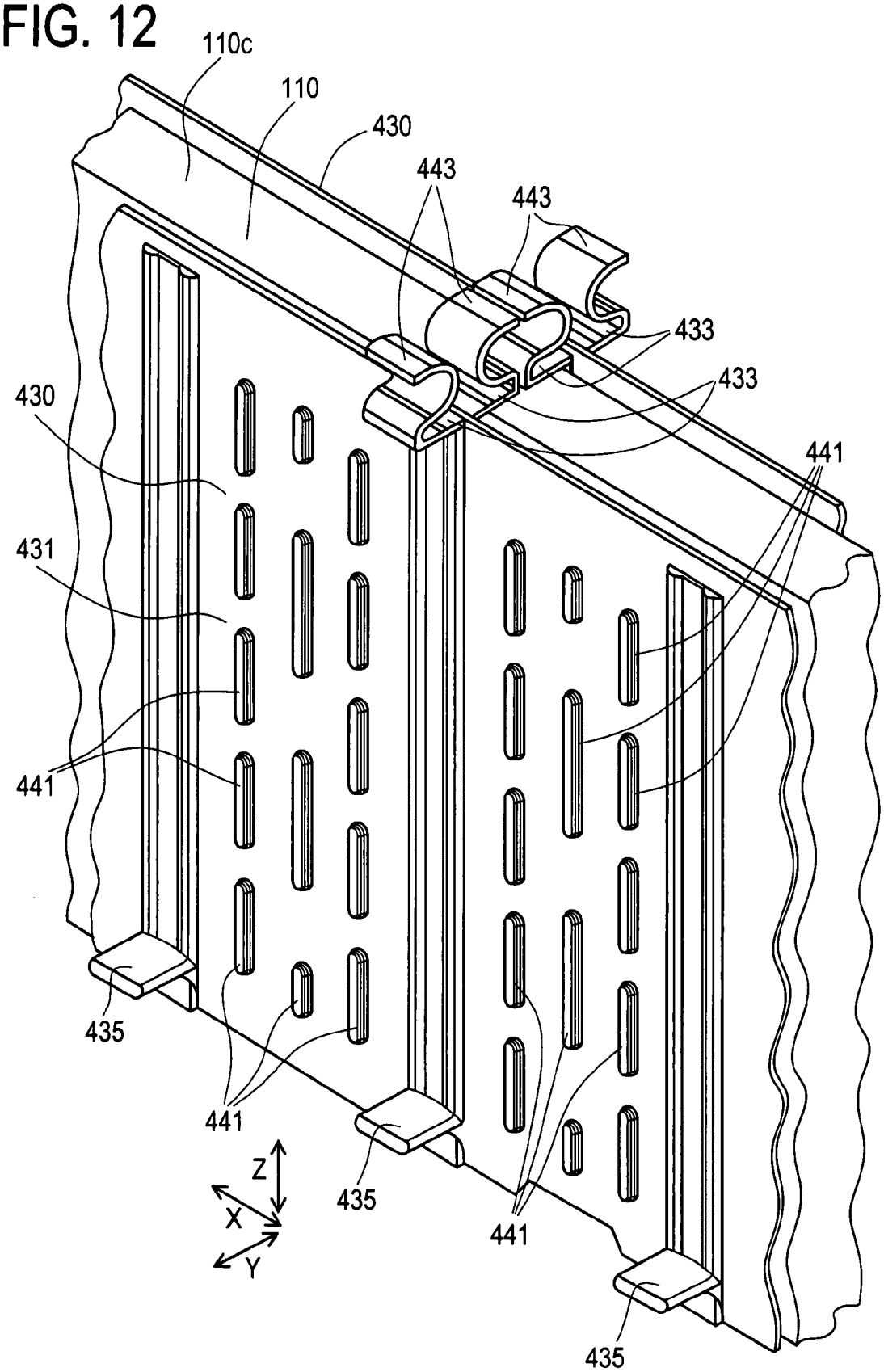
FIG. 12 is a partially perspective view showing part of a holding spacer of a battery pack of a fourth embodiment.

Next, a fourth embodiment of the invention will be described below. The description of the same parts as those of any one of the first to third embodiments will be omitted or simplified. FIG. 12 shows a holding spacer 430 included in a battery pack 400 of the fourth embodiment. In FIG. 12, the direction from the upper left side to the lower right side corresponds to the cell arrangement direction X; the direction from the upper right side to the lower left side to the module arrangement direction Y; and the direction perpendicular to the above-mentioned directions to the vertical direction Z. The structure of the holding spacer 430 of the battery pack 400 in the fourth embodiment is different from those of the holding spacers 130, 230, 330 of the battery pack 100 and the like in the above first to third embodiments. Other parts of this embodiment are basically the same as those of the first embodiment.

The holding spacer 430 according to the fourth embodiment has a spacer body 431 having a substantially plate-like shape and directly intervening in the space between the adjacent battery modules 110. A plurality of first module pressing portions 433 are provided on one end of the spacer body 431 in the vertical direction Z (on the upper end in FIG. 12) for elastically pressing against the short side 110c of the battery module 110 in the vertical direction Z, as in the above-mentioned third embodiment. These first module pressing portions 433 respectively protrude in the module arrangement direction Y to have a plate-like shape perpendicular to the vertical direction Z. A plurality of second module support portions 435 are provided on the other end of the spacer body 431 in the vertical direction Z (on the lower end in FIG. 12) for supporting the short side 110d of the battery modules 110 in the vertical direction Z, as in the first to third embodiments. Also, these second module support portions 435 respectively protrude in the module arrangement direction Y to have a plate-like shape perpendicular to the vertical direction Z.

The first module pressing portions 433 are placed on the base ends of first elastic portions 443 to be described later, in such a manner as to be deformable with the elastic deformation of the first elastic portions 443 in the vertical direction Z to elastically press against the short side 110c of the battery module 110 in the vertical direction Z. The battery module 110 is elastically clasped between the first module pressing portions 433 and the second module support portions 435 with the first module pressing portions 433 elastically pressing against the short side 110c of the battery module 110 in the vertical direction Z. Thus, the battery modules 110 are elastically held between the first module pressing portions 433 and the second module support portions 435. This can effectively restrain the battery modules 110 from freely moving in the battery pack 400, in particularly, in the vertical direction Z.

A plurality of third module support portions and fourth module support portions (not shown) are respectively provided on both ends in the cell arrangement direction X of the spacer body 431, as in the above first and subsequent embodiments. The battery module 110 is placed between the third module support portion and the fourth module support portion to be restrained from moving in the cell arrangement direction X. The spacer body 431 is provided with a number of cooling passage forming protrusions 441 for forming cooling passages through which the cooling medium passes between the long sides 110a and 110b of the battery modules, as in the first embodiment.

A plurality of first elastic portions 443 which are abutted against the first spacer support member 160 are provided on one end of the spacer body 431 in the vertical direction Z (on the upper end in FIG. 12). The first elastic portion 443 protrudes from the tip of the first module pressing portion 433 in the vertical direction Z. The first elastic portion 443 has a substantially C-like section., and is entirely formed of resin integrally with the spacer body 431. The first elastic portion 443 is elastically deformable in the vertical direction Z.

The holding spacers 430 are elastically clasped between the first spacer support member 160 and the second spacer support member 170 with the first elastic portions 443 elastically deformed in the vertical direction Z to be in elastic pressure contact with the first spacer support member 160. Thus, the holding spacers 430 are elastically held between the first spacer support member 160 and the second spacer support member 170. This can restrain the holding spacers 430 from freely moving inside the battery pack 400, particularly, in the vertical direction Z effectively for a long period, as compared with the conventional case.

The same parts as those of any one of the above-mentioned first to third embodiments have the same effects and advantages as those of any one of the first to third embodiments.

Fifth Embodiment

Figure 13:
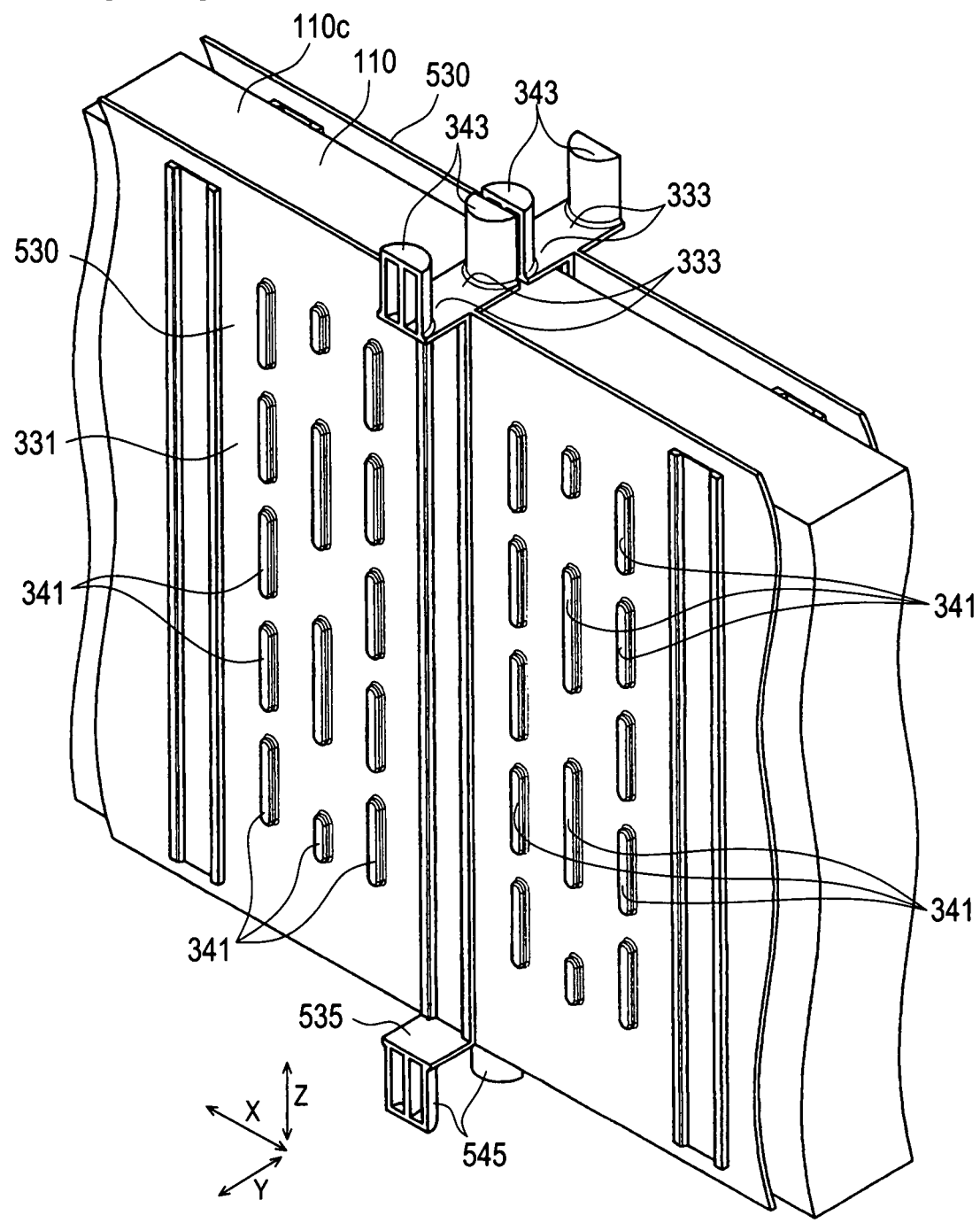
FIG. 13 is a partially perspective view showing part of a holding spacer of a battery pack of a fifth embodiment.

Next, a fifth embodiment of the invention will be described below. The description of the same parts as those of any one of the first to fourth embodiments will be omitted or simplified. FIG. 13 shows a holding spacer 530 included in a battery pack 500 of the fifth embodiment. In FIG. 13, the direction from the upper left side to the lower right side corresponds to the cell arrangement direction X; the direction from the upper right side to the lower left side to the module arrangement direction Y; and the direction perpendicular to the above-mentioned directions to the vertical direction Z. The structure of the holding spacer 530 of the battery pack 500 in this embodiment is different from those of the holding spacers 130, 230, 330, 430 of the battery pack 100 and the like in the above first to fourth embodiments. Other parts of this embodiment are basically the same as those of the first embodiment.

The holding spacer 530 according to the fifth embodiment has the spacer body 331 directly intervening in the space between the adjacent battery modules 110, as with the holding spacer 330 of the third embodiment. The plurality of first module pressing portions 333 are provided on one end of the spacer body 331 in the vertical direction Z (on the upper end in FIG. 13), as in the above-mentioned third embodiment.

On the other hand, a plurality of second module pressing portions 535, instead of the second module support portions 335 of the third embodiment, are provided on the other end of the spacer body 331 in the vertical direction Z (on the lower end in FIG. 13) for elastically pressing against the short side 110d of the battery module 110 in the vertical direction Z. These second module pressing portions 535 respectively protrude in the module arrangement direction Y to have a plate-like shape perpendicular to the vertical direction Z, as with the first module pressing portion 333.

The first module pressing portions 333 are placed on the base ends of the first elastic members (first elastic portions) 343 in such a manner as to be deformable with the elastic deformation of the first elastic members 343 in the vertical direction Z to elastically press against the short side 110c of the battery module 110 in the vertical direction Z, as in the third embodiment. The second module pressing portions 535 are placed on the base ends of second elastic members (second elastic portions) 545 to be described later, in such a manner as to be deformable with the elastic deformation of the second elastic members 545 in the vertical direction Z to elastically press against the short side 110d of the battery module 110 in the vertical direction Z.

The battery module 110 is elastically clasped between the first module pressing portions 333 and the second module pressing portions 535 with the first module pressing portions 333 and the second module pressing portions 535 elastically pressing against the short sides 110c and 110d of the battery module 110 in the vertical direction Z. Thus, the battery modules 110 are elastically held between the first module pressing portions 333 and the second module pressing portions 535. This can restrain the battery modules 110 from freely moving inside the battery pack 500, particularly, in the vertical direction Z more effectively than the case of the third embodiment.

The plurality of first elastic members (first elastic portions) 343 which are abutted against the first spacer support member 160 (see FIG. 6) are provided on one end of the spacer body 331 in the vertical direction Z (on the upper end in FIG. 13), as in the third embodiment.

The plurality of second elastic members (second elastic portions) 545 which are abutted against the second spacer support member 170 (see FIG. 6) are provided on the other end of the spacer body 331 in the vertical direction Z (on the lower end in FIG. 13), unlike in the third embodiment. These second elastic members 545 protrude from the tip of the second module pressing portions 535 in the vertical direction Z. The second elastic member 545, as with the first elastic member 343, has a semi-cylindrical shape, and faces another second elastic member 545 corresponding to the adjacent holding spacer 530 to construct a protrusion portion having a substantially cylindrical shape. The second elastic member 545 is made of rubber, and elastically deformable in the vertical direction Z, as with the first elastic member 343.

The holding spacers 530 are elastically clasped between the first spacer support member 160 and the second spacer support member 170 with the first elastic members 343 and the second elastic members 545 elastically deformed in the vertical direction Z to be in elastic pressure contact with the first spacer support member 160 and the second spacer support member 170. Thus, the holding spacers 530 is elastically held between the first spacer support member 160 and the second spacer support member 170. This can restrain the holding spacers 530 from freely moving inside the battery pack 500, particularly, in the vertical direction Z effectively for a long period, as compared with the case of the third embodiment.

The same parts as those of any one of the above-mentioned first to fourth embodiments have the same effects and advantages as those of any one of the first to fourth embodiments.

Sixth Embodiment

Figure 14:
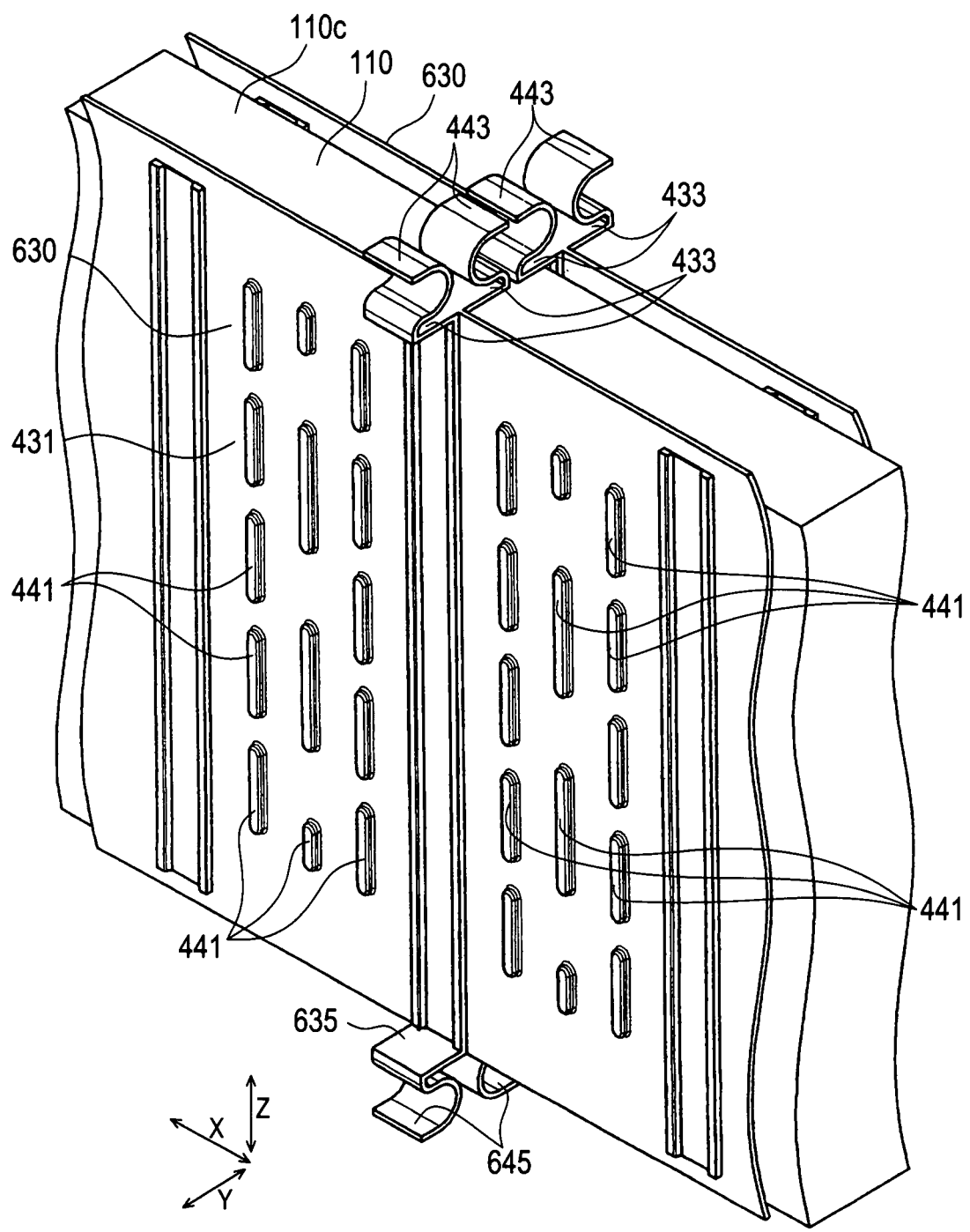
FIG. 14 is a partially perspective view showing part of a holding spacer of a battery pack of a sixth embodiment.

Next, a sixth embodiment of the invention will be described below. The description of the same parts as those of any one of the first to fifth embodiments will be omitted or simplified. FIG. 14 shows a holding spacer 630 included in a battery pack 600 of the sixth embodiment. In FIG. 14, the direction from the upper left side to the lower right side corresponds to the cell arrangement direction X; the direction from the upper right side to the lower left side to the module arrangement direction Y; and the direction perpendicular to the above-mentioned directions to the vertical direction Z. The structure of the holding spacer 630 of the battery pack 600 in this embodiment is different from those of the holding spacers 130, 230, 330, 430, 530 of the battery pack 100 and the like in the above first to fifth embodiments. Other parts of this embodiment are basically the same as those of the first embodiment.

The holding spacer 630 according to the sixth embodiment has the spacer body 431 directly intervening in the space between the adjacent battery modules 110, as with the holding spacer 430 of the fourth embodiment. The plurality of first module pressing portions 433 are provided on one end of the spacer body 431 in the vertical direction Z (on the upper end in FIG. 14), as in the above-mentioned fourth embodiment.

On the other hand, a plurality of second module pressing portions 635, instead of the second module support portions 435 of the fourth embodiment, are provided on the other end of the spacer body 431 in the vertical direction Z (on the lower end in FIG. 14) for elastically pressing against the short side 110d of the battery module 110 in the vertical direction Z. These second module pressing portions 635 respectively protrude in the module arrangement direction Y to have a plate-like shape perpendicular to the vertical direction Z, as with the first module pressing portion 433.

The first module pressing portions 433 are placed on the base ends of the first elastic portions 443 in such a manner as to be deformable with the elastic deformation of the first elastic members 443 in the vertical direction Z to elastically press against the short side 110c of the battery module 110 in the vertical direction Z, as in the fifth embodiment. The second module pressing portions 635 are placed on the base ends of second elastic portions 645 to be described later, in such a manner as to be deformable with the elastic deformation of the second elastic members 645 in the vertical direction Z to elastically press against the short side 110d of the battery module 110 in the vertical direction Z.

The battery module 110 is elastically clasped between the first module pressing portions 433 and the second module pressing portions 635 with the first module pressing portions 433 and the second module pressing portions 635 elastically pressing against the short sides 110c and 110d of the battery module 110 in the vertical direction Z. Thus, the battery modules 110 are elastically held between the first module pressing portions 433 and the second module pressing portions 635. This can restrain the battery modules 110 from freely moving inside the battery pack 600, particularly, in the vertical direction Z more effectively than the case of the fourth embodiment.

The plurality of first elastic portions 443 which are abutted against the first spacer support member 160 (see FIG. 6) are provided on one end of the spacer body 431 in the vertical direction Z (on the upper end in FIG. 14), as in the fourth embodiment.

On the other hand, the plurality of second elastic portions 645 which are abutted against the second spacer support member 170 (see FIG. 6) are provided on the other end of the spacer body 431 in the vertical direction Z (on the lower end in FIG. 14), unlike in the fourth embodiment. These second elastic portions 645 protrude from the tip of the second module pressing portion 635 in the vertical direction Z. The second elastic portion 645, as with the first elastic portion 443, has a substantially C-like shape, and is formed of resin integrally with the spacer body 431. Also, the second elastic portion 645 is elastically deformable in the vertical direction Z.

The holding spacers 630 are elastically clasped between the first spacer support member 160 and the second spacer support member 170 with the first elastic portions 443 and the second elastic portions 645 elastically deformed in the vertical direction Z to be in elastic pressure contact with the first spacer support member 160 and the second spacer support member 170. Thus, the holding spacers 630 are elastically held between the first spacer support member 160 and the second spacer support member 170. This can restrain the holding spacers 630 from freely moving inside the battery pack 600, particularly, in the vertical direction Z effectively for a long period, as compared with the case of the fourth embodiment.

The same parts as those of any one of the above-mentioned first to fifth embodiments have the same effects and advantages as those of any one of the first to fifth embodiments.

Although in the above description the invention has been explained with reference to the first to sixth embodiments, the invention is not limited to the above embodiments. It will be apparent to those skilled in the art that various modifications and variations can be made to the disclosed embodiments without departing from the scope of the invention.

For example, in the above-mentioned third and fourth embodiments, the first elastic portions 343, 443 to be elastically deformed in the vertical direction Z are provided only at the upper ends of the holding spacers 330, 430. As mentioned in the above fifth and sixth embodiments, the second elastic portions 545, 645 to be elastically deformed in the vertical direction Z can be provided at the lower ends of the holding spacers 330, 430, as in the above first and second embodiments. This can restrain the free movement of the holding spacers 330, 430 more effectively.

Furthermore, the second module pressing portions 535, 635 to be elastically deformed in the vertical direction Z to be in elastic pressure contact with the battery modules 110 can be provided at the basic ends of these second elastic portions, as mentioned in the fifth and sixth embodiments. This can restrain the free movement of the battery modules 110 more effectively.

INDUSTRIAL APPLICABILITY

As can be seen from the above description, the invention can provide a battery pack that can restrain the movement of a battery module and a holding spacer even after use for a long period.

The invention claimed is:
1. A battery pack comprising:
a plurality of battery modules, each having two opposing long sides, two opposing short sides that are shorter than the long sides, and two opposing end surfaces, being covered by a film, and including a plurality of cells arranged in line, the plurality of battery modules being arranged in a direction perpendicular to a cell arrangement direction in which the cells are arranged, each of the cells having a rectangular parallelepiped shape and a safety valve, and the cells being separate from each other, connected with each other in series, and placed so that the safety valves of the cells face one of the short sides of the battery modules, end faces of the cells face each other, and long sides of the cells form a continuous surface along each of the long sides of the battery modules;

a plurality of holding spacers placed one each between the battery modules to hold the battery modules located on both sides of each holding spacer, each holding spacer including a spacer body made of resin having electrical insulating properties and formed in a plate-like shape, and the spacer body including, on both sides of the spacer body, protrusions for forming cooling passages by contacting the long sides of the battery modules, the battery modules and the holding spacers being integrally retained; and a first spacer support member and a second spacer support member which hold the holding spacers therebetween in a vertical direction perpendicular to both the cell arrangement direction and a module arrangement direction in which the battery modules are arranged, wherein:

the battery modules and the holding spacers are integrated and retained by two end plates positioned on opposite sides, in the module arrangement direction, of the battery modules and the holding spacers, the end plates being held together by members extending between the end plates along the outside of the battery modules and the holding spacers;

each of the holding spacers includes one or more first elastic portions arranged to face and be elastically deformed against, in the vertical direction, the first spacer support member;

the holding spacers are elastically held between the first and second spacer support members while the one or more first elastic portions is elastically deformed in the vertical direction into elastic pressure contact with the first spacer support member; and each of the holding spacers includes one or more third elastic portions made of plate-like rubber members and arranged to face, hold, and be elastically deformed against, in the module arrangement direction, one of the long sides of one of the battery modules while the one or more third elastic portions are in elastic pressure contact with the one of the long sides.

2. The battery pack according to claim 1, wherein the one or more first elastic portions is made of rubber.

3. The battery pack according to claim 1, wherein each of the holding spacers includes one or more second elastic portions arranged to face and be elastically deformed against, in the vertical direction, the second spacer support member, and the holding spacers are elastically held between the first and second spacer support members while the one or more first elastic portions is elastically deformed in the vertical direction into elastic pressure contact with the first spacer support member and the one or more second elastic portions is elastically deformed in the vertical direction into elastic pressure contact with the second spacer support member.

4. The battery pack according to claim 3, wherein the one or more second elastic portions is made of rubber.

5. The battery pack according to claim 1, wherein each of the holding spacers includes a first module pressing portion and a second module support portion which hold each of the battery modules in the vertical direction, wherein the first module pressing portion elastically presses the battery module in the vertical direction in association with the elastic deformation of the one or more first elastic portions, and the second module support portion supports the battery module in the vertical direction, and the battery module is elastically held between the first module pressing portion and the second module support portion while the first module pressing portion elastically presses the battery module in the vertical direction.

6. The battery pack according to claim 3, wherein each of the holding spacers includes a first module pressing portion and a second module pressing portion which hold each of the battery modules in the vertical direction, wherein the first module pressing portion elastically presses the battery module in the vertical direction in association with the elastic deformation of the one or more first elastic portions, and the second module pressing portion elastically presses the battery module in the vertical direction in association with the elastic deformation of the one or more second elastic portions, and the battery module is elastically held between the first module pressing portion and the second module pressing portion while the first module pressing portion elastically presses the battery module in the vertical direction and the second module pressing portion also elastically presses the battery module in the vertical direction.

7. The battery pack according to claim 1, wherein each of the holding spacers and the one or more third elastic portions are separate from the battery modules, each of the holding spacers having two sides, each of the sides facing and holding a respective one of the battery modules;

the one or more third elastic portions are arranged on each of the sides of each of the holding spacers; and each of the battery modules is elastically held by the holding spacers while one or more of the third elastic portions is elastically deformed, in the module arrangement direction, into elastic pressure contact with a side surface of a cell of the battery module, the side surface facing the one or more of the third elastic portions, and being directed in the module arrangement direction.

8. The battery pack according to claim 3, wherein each of the holding spacers includes a first module pressing portion and a second module support portion which hold each of the battery modules in the vertical direction, wherein the first module pressing portion elastically presses the battery module in the vertical direction in association with the elastic deformation of the one or more first elastic portions, and the second module support portion supports the battery module in the vertical direction, and the battery module is elastically held between the first module pressing portion and the second module support portion while the first module pressing portion elastically presses the battery module in the vertical direction.

* * * * *